(12) United States Patent
Younger et al.

(10) Patent No.: US 6,445,966 B1
(45) Date of Patent: Sep. 3, 2002

(54) DATA INTERFACE MODULE FOR MOTOR CONTROL SYSTEM

(75) Inventors: Charles T. Younger, New Berlin; Thomas M. Ruchti, Brookfield; Erik W. Linske, Greendale, all of WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/266,550

(22) Filed: Mar. 11, 1999

(51) Int. Cl.[7] .............................................. G05B 15/00
(52) U.S. Cl. ............................ 700/83; 700/17; 700/30; 700/31; 700/65; 700/66; 700/170; 318/161; 318/600; 318/601; 318/609; 318/610; 345/786; 345/157; 345/973; 345/974
(58) Field of Search ............................... 700/31–34, 17, 700/46–47, 83, 63–71, 170, 188; 318/561, 600, 601, 609, 610; 345/157, 786, 973, 974

(56) References Cited

U.S. PATENT DOCUMENTS

| | | | | |
|---|---|---|---|---|
| 4,218,735 A | * | 8/1980 | McCutheon | 700/90 |
| 5,168,441 A | * | 12/1992 | Onarheim et al. | 700/17 |
| 5,287,449 A | * | 2/1994 | Kojima | 345/161 |
| 5,392,207 A | * | 2/1995 | Wilson et al. | 700/64 |
| 5,453,926 A | * | 9/1995 | Stroschin et al. | 700/83 |
| 5,754,424 A | * | 5/1998 | Melvin | 700/37 |
| 5,874,955 A | * | 2/1999 | Rogowitz et al. | 345/339 |
| 5,909,372 A | * | 6/1999 | Thybo | 700/83 |
| 6,007,227 A | * | 12/1999 | Carlson | 700/65 |
| 6,160,365 A | * | 12/2000 | Younger et al. | 318/16 |
| 6,163,129 A | * | 12/2000 | Younger et al. | 318/799 |
| 6,192,286 B1 | * | 2/2001 | Oku | 700/95 |
| 6,199,018 B1 | * | 3/2001 | Quist et al. | 702/34 |

* cited by examiner

Primary Examiner—Ramesh Patel
(74) Attorney, Agent, or Firm—Boyle Fredrickson Newholm Stein & Gratz S.C.

(57) ABSTRACT

An data interface module is provided for allowing a user to remotely modify a predetermined number of operating parameters of a motor driven by a motor control and for displaying the same. The interface module includes a microcontroller interconnected to a communications network and a visual display structure. The visual display structure has a first screen which displays a scrollable list of the operating parameters and a second screen which displays a data value for a user selected one of the operating parameters. A user may modify the user selected operating parameter when the second screen is displayed.

27 Claims, 24 Drawing Sheets

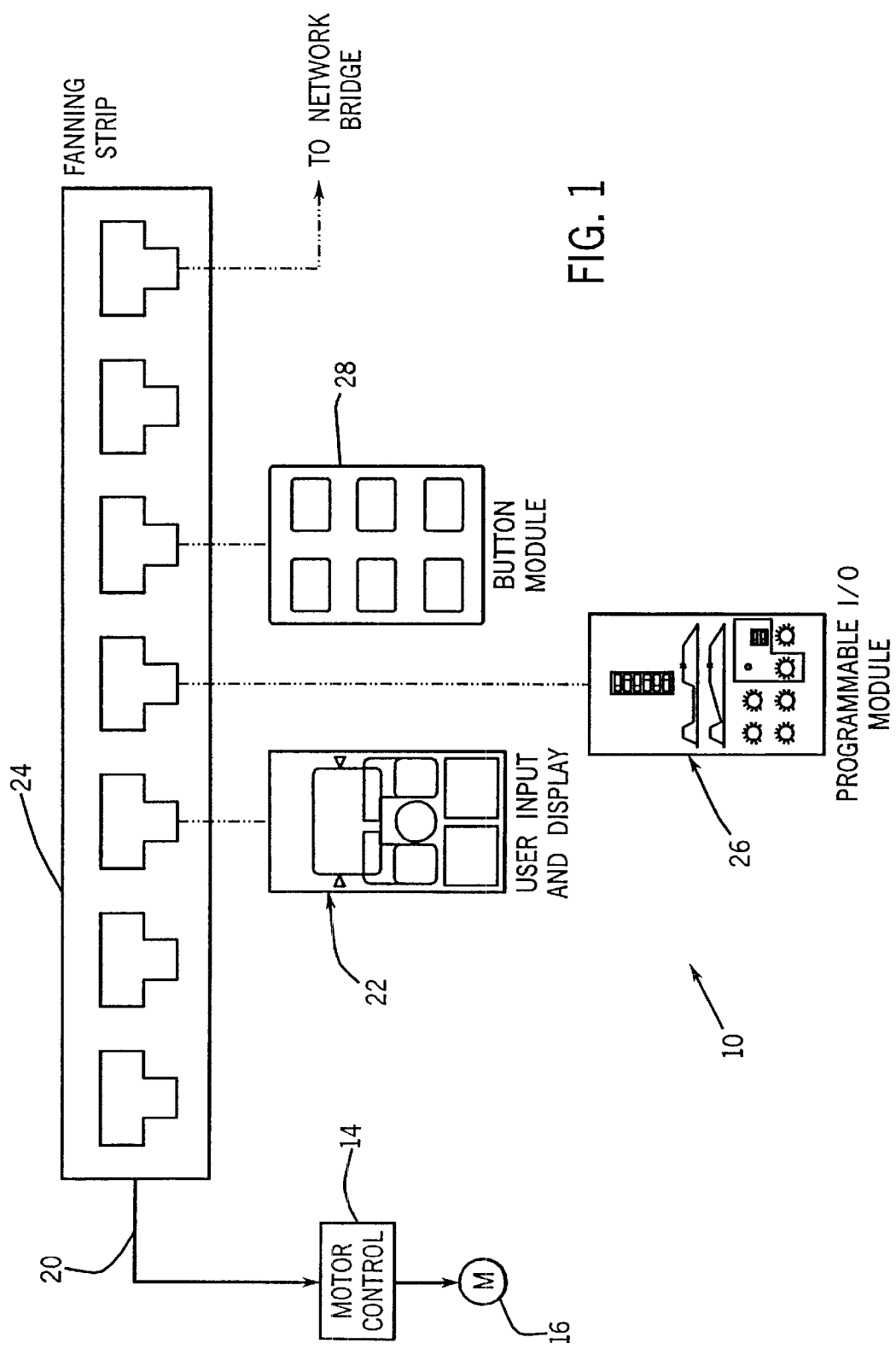

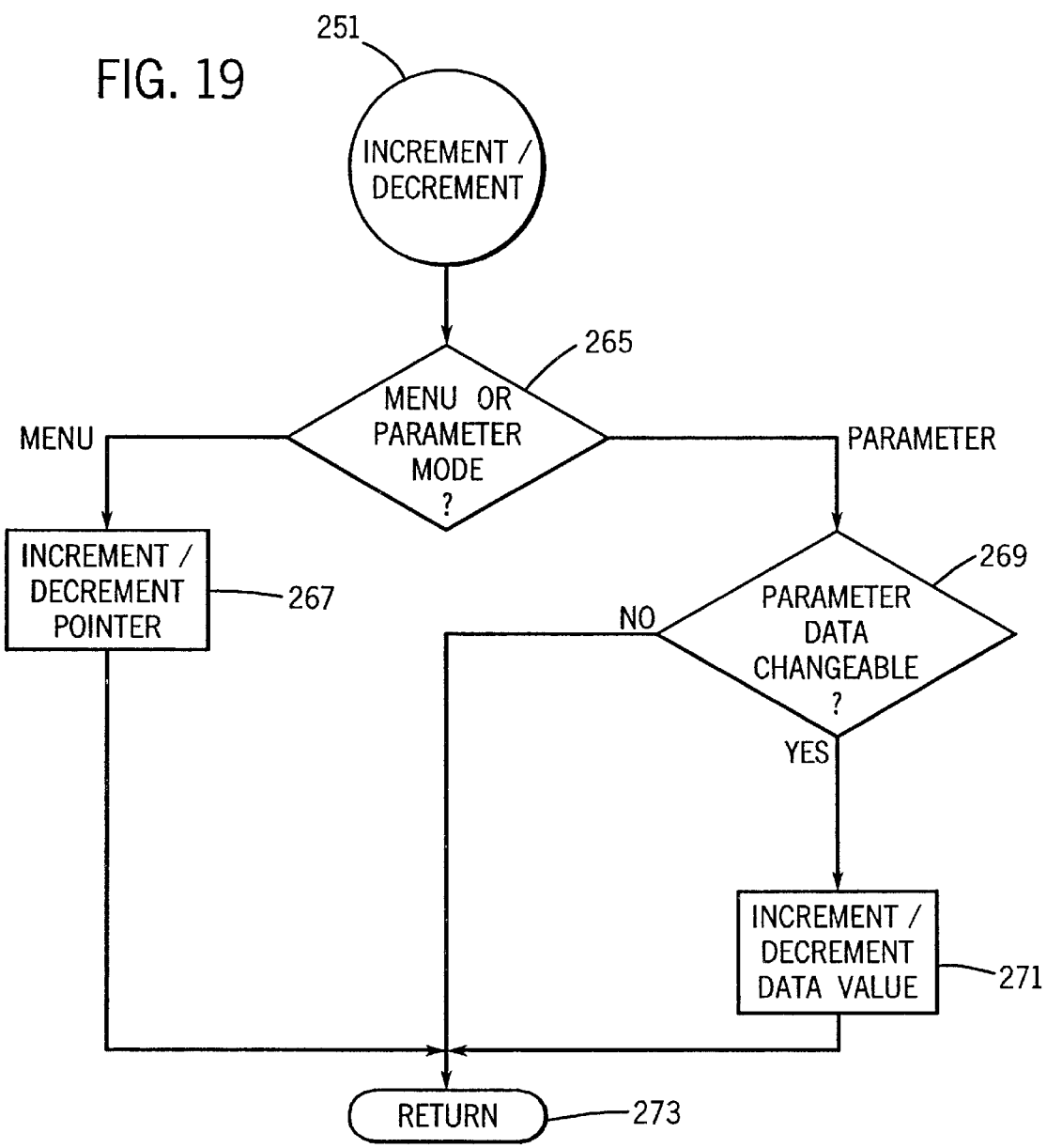

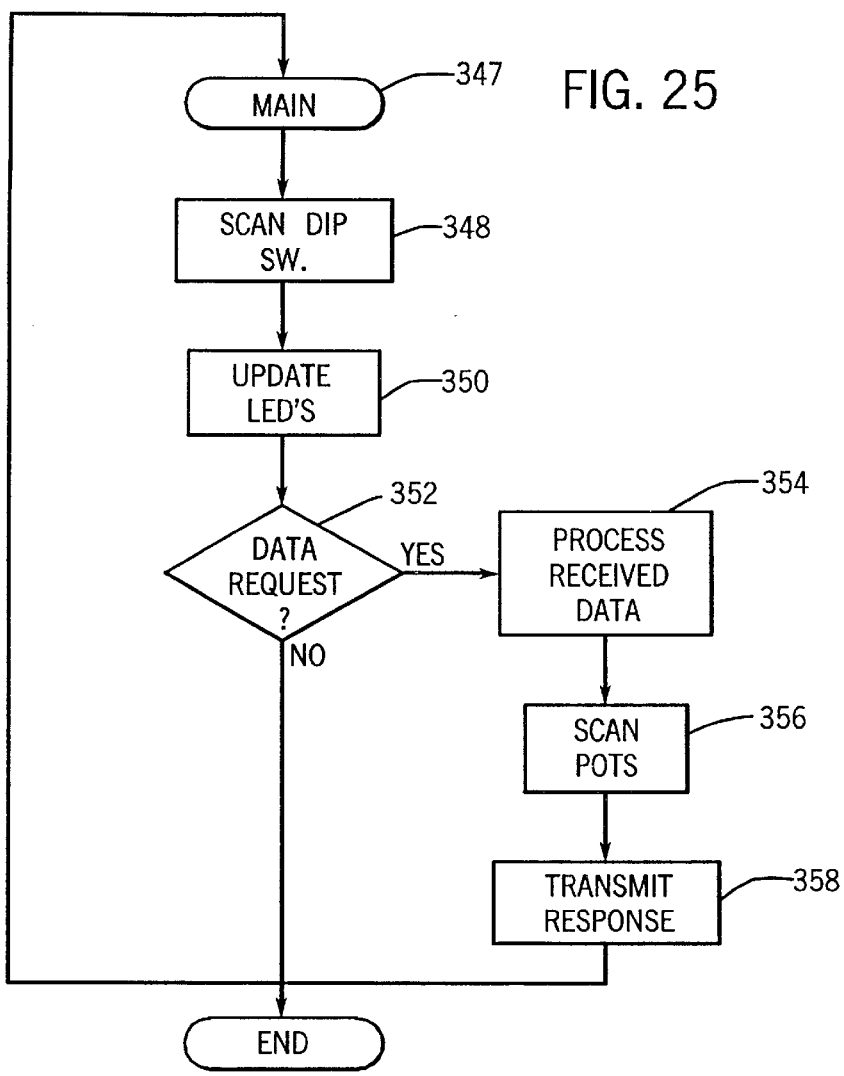
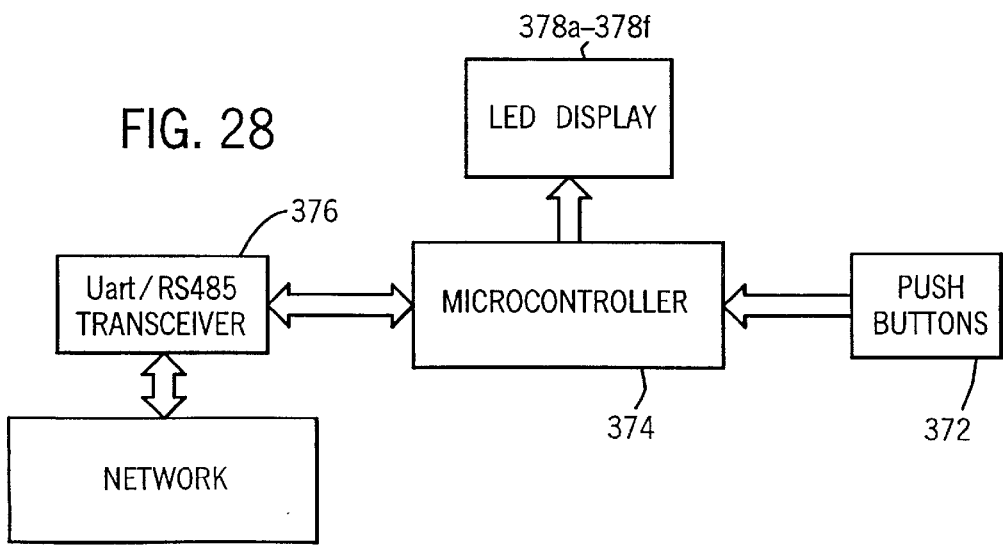

DATA INTERFACE MODULE FOR MOTOR CONTROL SYSTEM

BACKGROUND AND SUMMARY OF THE PRESENT INVENTION

This invention relates to motor control systems, and in particular, to a data interface module which allows a user to modify a predetermined number of operating parameters of an AC induction motor from a remote location and for displaying such parameters.

There are two basic approaches for controlling the starting, stopping and speed of an AC induction motor. In a first approach, an adjustable frequency controller is interconnected to the AC induction motor. The adjustable frequency controller is comprised of an inverter which uses solid state switches to convert DC power to stepped waveform AC power. A waveform generator produces switching signals for the inverter under control of a microprocessor. While adjustable frequency controllers efficiently control the motor speed and the energy used by an AC induction motor, use of such types of controllers may be cost prohibitive. Further, since many applications of AC induction motors do not require sophisticated frequency and voltage control, an alternative to adjustable frequency controllers has been developed.

An alternate approach to the adjustable frequency controller is the soft starter. Soft starters operate using the principal of phase control whereby the three phase main supply to the AC induction motor is controlled by means of anti-parallel thyristor switches in each supply line. In phase control, the thyristor switches in each supply line are fired to control the fraction of the half cycle over which current is conducted to the motor, known as the conduction period. The non-conducting period of each half cycle (known as the hold-off angle or the notch width) is visible as a notch in the voltage waveform at each motor terminal. During this period, no current flows to the motor terminals. To end the non-conducting period, the thyristor switches in the supply line to the motor terminals are fired to restart their conduction. The conduction through the thyristor switches continues until the current, once again, becomes zero at some point in the next half cycle and the thyristor switches reopen. According to the principles of phase control, by varying the duration of the non-conducting period, the voltage and current supplied to the AC induction motor may be controlled. As is known, a single microprocessor has been used to fire the thyristor switches in order to control the voltage and current supplied to the AC induction motor.

In order to accurately control the starting, stopping and speed of the AC induction motor, the microprocessors used in adjustable frequency controllers and the soft starters must execute extensive control algorithms. High performance microprocessors are necessary to perform the numerous calculations required at an acceptable computational speed. The types of high performance microprocessors are expensive and increase the overall cost of the motor control. Therefore, it is highly desirable to provide a motor control system which provides the desired control of the motor at a lower cost.

In addition, use of a single microprocessor in motor control applications limits the flexibility of such motor control. Heretofore, motor controls have been built as single, integral units. Such units provide for limited input and output options for the user. As a result, prior art motor controls limit a user's ability to monitor certain operating parameters or require special hardware to order to have certain operating parameters displayed or controlled. Therefore, it is highly desirable to provide a motor control which allows for greater flexibility for the users thereof Therefore, it is a primary object and feature of the present invention to provide a motor control system which incorporates distributed processing to reduce the cost and improve performance of the motor control system.

It is a still further object and feature of the present invention to provide a motor control system which increases the flexibility for the users thereof.

It is a still further object and feature of the present invention to provide an input/output device for a motor control system which is simple to use and inexpensive to manufacture.

In accordance with the present invention, a data interface module is provided for allowing a user to modify predetermined operating parameters for a motor driven by a motor control and for displaying the operating parameters. The motor control is operatively connected to a communications network for transmitting and receiving data. The data interface module includes a visual display structure operatively connected to the communications network. The visual display structure selectively displays one of a plurality of user selected screens. The user selected screens include a first screen for displaying a user scrollable list of operating parameters for the motor and a second screen for displaying a data value for the user selected operating parameter. A screen selection device is operatively connected to the visual display structure for allowing a user to toggle between the first and second screens.

A micro-controller is operatively connected to the visual display structure and a communications link which, in turn, interconnects the micro-controller to the communications network. The communications link receives a predetermined packet of data from the motor control corresponding to the data value of the user selected operating parameter and provides the same to the micro-controller such that the micro-controller causes the visual display structure to display the data value of the user selected operating parameter on the second screen.

A data value adjustment device is operatively connected to the micro-controller for adjusting the data value of the user selected operating parameter displayed to a user selected data value. The data value adjustment device includes a shaft encoder wherein rotation of the shaft varies the data value of the user selected operating parameter of the motor.

A memory storage device may be operatively connected to the motor control for storing the user scrollable list of operating parameters. The memory storage device includes a serial EEPROM which is interfaced to the micro-controller by a serial peripheral interface. It is contemplated that the visual display structure include a liquid crystal display and that the screen selection device include a pushbutton movable between a first non-depressed position and a second depressed position wherein the pressing of the pushbutton into the depressed position toggles the visual display structure between the first and second screens. At least one of the screens of the visual display structure displays an operating direction for the motor. As such, it is contemplated to provide a motor direction scrolling device operatively connected to the visual display structure for changing the display of the operating direction of the motor. A motor direction selection device is also operatively connected to the motor controller for changing the operating direction of the motor to the operating direction displayed.

In accordance with a further aspect of the present invention, data interface module is provided for allowing a user to modify the value of predetermined operating parameters for a motor driven by a motor control and for displaying a value of the operating parameters. The motor control is operatively connected to a communications network. The data interface module includes a micro-controller for generating adjustment signals to adjust the value of a user selected operating parameter of the motor. A communications link interconnects the micro-controller and the communications network in order to transmit the adjustment signals to the motor control. A visual display structure is operatively connected to the motor controller. The visual display structure selectively displays one of a plurality of user selected screens. The user selected screens include a first screen for displaying a user scollable list of operating parameters for the motor and a second screen for displaying the value of the user selected operating parameter. A screen selection device is operatively connected to the visual display structure for allowing the user to toggle between the first and second screens. A parameter value adjustment device is operatively connected to the micro-controller and has a plurality of discrete settings. The micro-controller generates a corresponding adjustment signal in response to the setting of the parameter value adjustment device.

It is contemplated that the micro-controller include a universal asynchronous receiver/transmitter. The communications link includes a transceiver which is operatively connected to the universal asynchronous receiver/transmitter of the micro-controller and to the network.

It is contemplated that the micro-controller adjust the display of the value of the user selected operating parameter in response to the setting of the parameter value adjustment device. The parameter value adjustment device may include a shaft encoder wherein rotation of the shaft encoder varies the setting of the parameter value adjustment device.

At least one of the screens of the visual display structure displays an operating direction for a motor. Depression of a motor direction scrolling device causes the visual display structure to sequentially display each operating direction of the motor in response thereto. A motor direction selection device is provided for changing the operating direction of the motor to the operating direction displayed.

The micro-controller may include a plurality of micro-controller executable instructions stored thereon. Such instructions allow micro-controller to perform the steps of determining the types of motor controls interconnected to the communications network; downloading a list of predetermined operating parameters to be displayed on the first screen of the visual display structure from the motor control; and displaying a user selected portion of the list of the predetermined operating parameters on the first screen of the visual display structure.

In accordance with a still further aspect of the present invention, a method for allowing a user to modify the values of predetermined operating parameters for a motor driven by a motor control and for displaying the values of the operating parameters is provided. The method includes the steps of providing a data interface module having a visual display. The data interface module is interconnected to a communications network and determines the other motor controls also interconnected thereto. The data interface module downloads a list of predetermined operating parameters from the motor control and displays a user selected portion of the list of predetermined operating parameters on the visual display. A user selects one of the predetermined operating parameters to be displayed such that the data interface module displays the selected operating parameter and the value thereof on the visual display.

The method of the present invention may also include the additional step of adjusting the value of the selected operating parameter. In addition, the method may include the additional steps of displaying one of a plurality of operating directions of a motor on the visual display; scrolling through the plurality of operating directions of the motor on the visual display; and selecting one of the plurality of operating directions of the motor and providing the same as the selected motor direction. Thereafter, the motor is operated in the selected motor direction.

The data interface device may include a stop button such that depression of the stop button stops the motor. In addition, the data interface device may include a EEPROM which stores a list of predetermined operating parameters thereon.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a schematic view of a motor control system in accordance with the present invention;

FIG. 3 is a flow chart of computer executable instructions for the microprocessor of the soft starter of FIG. 2a;

FIG. 19 is a flow chart of the Increment/Decrement subroutine of the computer executable instructions of FIG. 16;

FIG. 25 is a flow chart of the Main subroutine of the computer executable instructions of FIG. 24;

FIG. 28 is a schematic view of the button module of FIG. 26; and

DETAILED DESCRIPTION OF THE DRAWINGS

Figure 2A:
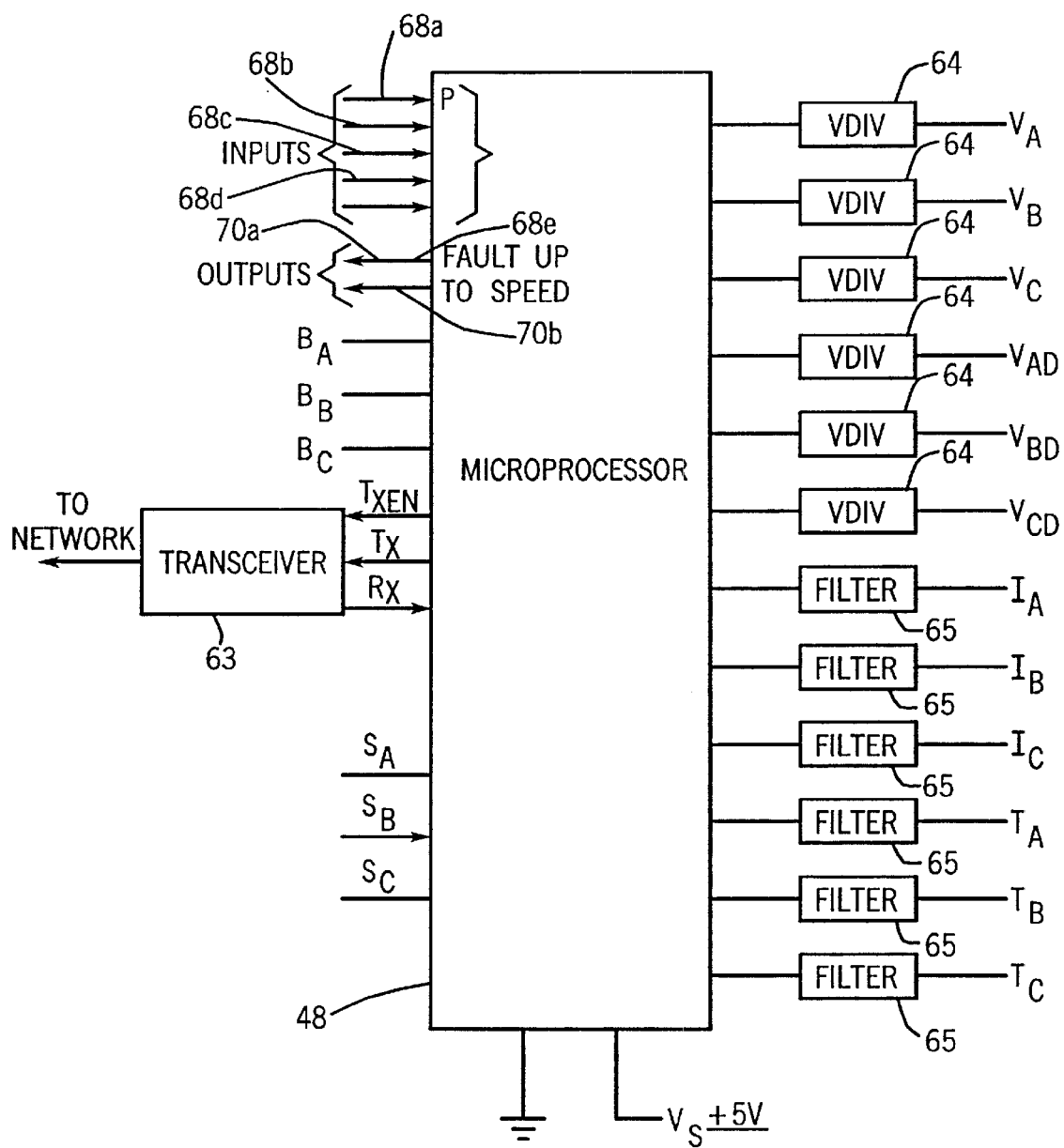
FIGS. 2a and 2b are schematic views of a soft starter for the motor control system of FIG. 1.
Figure 2B:
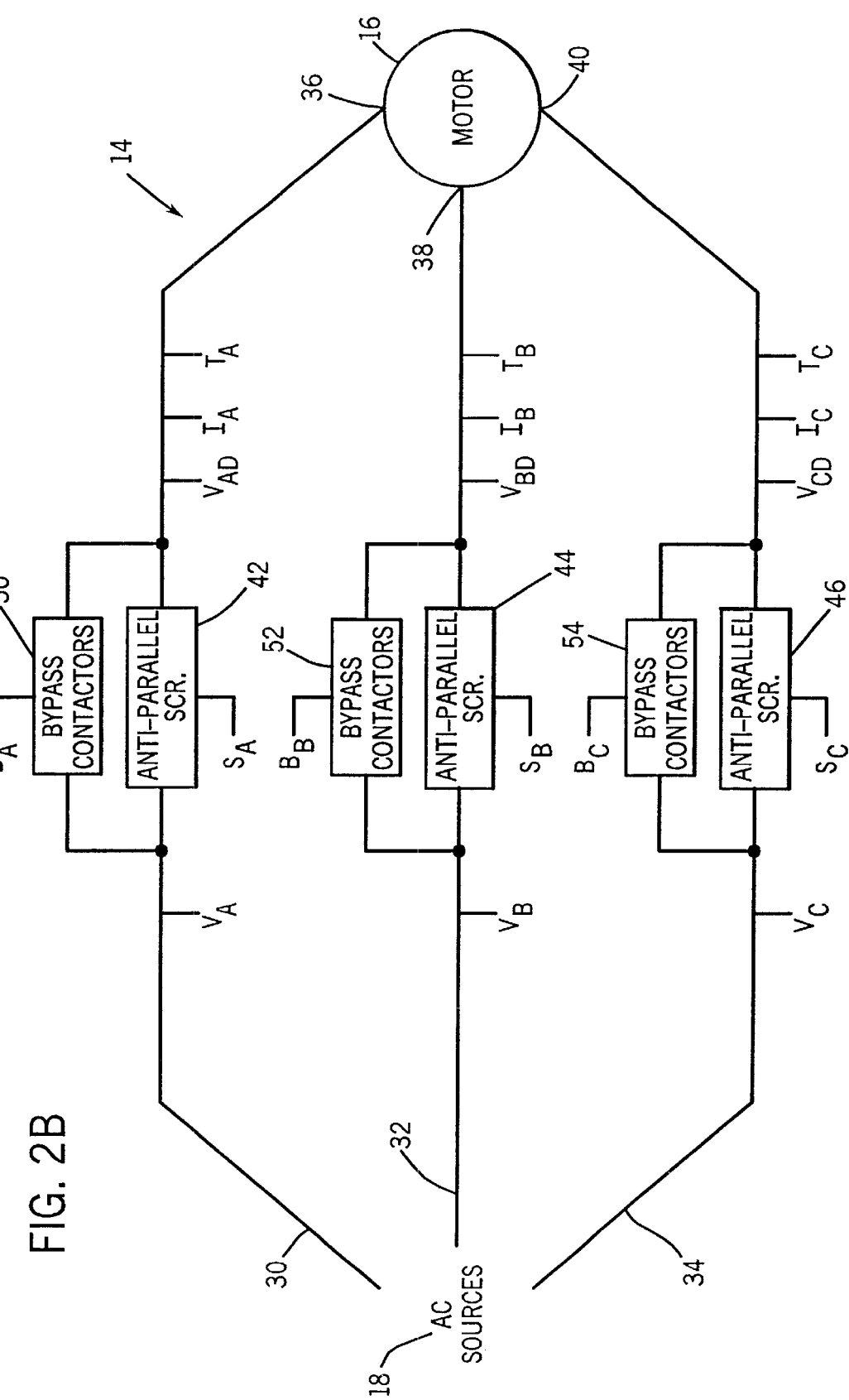

Referring to FIG. 1, a motor control system in accordance with the present invention is generally designated by the reference number 10. Motor control system 10 includes a predominant motor control such as soft starter 14, FIGS. 2a–2b, which couples AC induction motor 16 to an AC source 18, as hereinafter described. As best seen in FIGS. 1–2, soft starter 14 is interconnected to a network through a bus 20.

Motor control system 10 may include a plurality of peripheral motor controls such as user input and display unit 22 which is interconnected to the network through a network interface 24. Similarly, a programmable input/output module 26 may be interconnected to the network through network interface 24. In addition, button module 28 may be interconnected to the network through network interface 24. It is contemplated that motor control system 10 include soft starter 14 and any combination of user input and display module 22, programmable input/output module 26 and/or button module 28 depending on the user determined considerations.

Communications between soft starter 14, user input and display unit 22, programmable input/output module 26 and/or button module 28 over the network must be managed so that all of the communications between the various motor controls get through. Consequently, a protocol must be selected to control the transmission of signals over the network to prevent the possible collision of packets of information. It is contemplated that the protocol be a serial protocol such that each motor control may be attached to the network using a conventional universal asynchronous receiver/transmitter and that the individual packets of information or signals may be transmitted serially.

As is conventional, AC induction motor 16 has three windings. Each winding of AC induction motor 16 is operatively connected to a corresponding supply line 30, 32 and 34 from an AC source 18 at motor terminals 36, 38 and 40, respectively. Anti-parallel silicon controlled rectifiers (SCRs) or thyristor switches 42, 44, and 46 are also provided. Each thyristor switch 42, 44 and 46 consists of a pair of inversely connected SCRs used to control the voltage on, and the current through, an associated supply line 30, 32, and 34, respectively, which, in turn, alters the current supplied to and the voltage at motor terminals 36, 38, and 40, respectively, of AC induction motor 16.

Figure 13A:
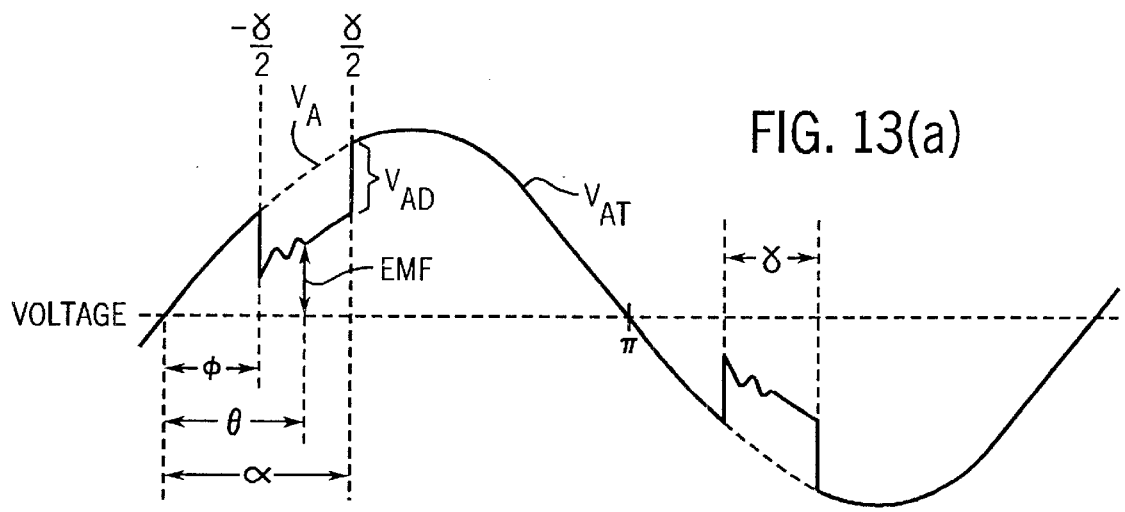
FIGS. 13(a) and 13(b) are graphical representations of the voltage across and the current through an anti-parallel SCR in FIG. 1 as a function of time.
Figure 13B:
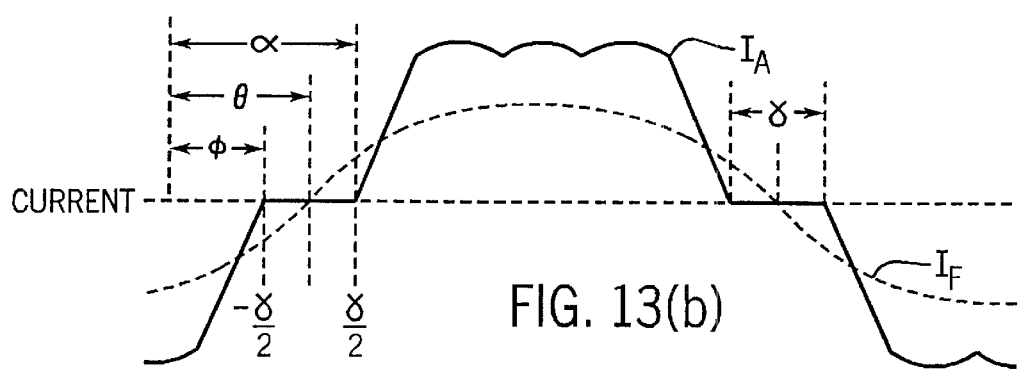

The terminal voltages at motor terminals 36, 38 and 40 of AC induction motor 16, the supply voltages $V_A$, $V_B$ and $V_C$, and the line currents $I_A$, $I_B$ and $I_C$ are identical but for being 120° out of phase with each other. By way of example, referring to FIGS. 2b and 13a–13b, terminal voltage $V_T$ at motor terminal 36 is compared to the line current $I_A$ and the supply voltage $V_A$ from AC source 18. As is known, the waveform of supply voltage $V_A$ is sinusoidal. When controlled by phase control, the terminal voltage $V_T$ is generally identical to the supply voltage $V_A$ except during a small non-conducting time or notch having a duration γ which is introduced into each half cycle of supply voltage $V_A$. Notch γ is introduced into the supply voltage $V_A$ each time line current $I_A$ falls to zero. Line current $I_A$ remains at zero until the end of notch γ at which time line current $I_A$ continues a pulsating waveform.

The supply line current $I_A$ is controlled by the duration of notch γ. During notch γ, thyristor switch 42 which interconnects motor terminal 36 to AC source 18 operates as an open circuit so that instead of observing sinusoidal supply voltage $V_A$ at motor terminal 36, an internal motor generated back EMF voltage may be seen. The back EMF voltage is generally equal to the source voltage $V_A$ minus the voltage drop $V_{AD}$ across thyristor switch 42.

As is known, there are various approaches to bring AC induction motor 16 to its operating speed. In the first approach, line currents $I_A$, $I_B$ and $I_C$ are gradually increased over a period of time. In order to increase the line currents $I_A$, $I_B$ and $I_C$ applied to AC induction motor 16, the conduction period of thyristor switches 42, 44 and 46 is increased. As the conduction period of the thyristor switches 42, 44 and 46 is gradually increased during each half cycle, the duration of notch γ in the voltage waveforms at motor terminals 36, 38 and 40 is reduced. In addition, as the conduction period of thyristor switches 42, 44 and 46 is gradually increased and the motor 16 approaches operating speed, the back EMF voltages at motor terminals 36, 38, and 40 increase. It is contemplated that once the back EMF voltages at motor terminals 36, 38 and 40 exceed a predetermined value, the AC induction motor 16 is considered operating at its full operating speed. If the motor current has fallen to the FLA for the AC induction motor 16, the bypass contactors 50, 52, and 54 are sequentially closed. With bypass contactors 50, 52 and 54 closed, motor terminal 36 of AC induction motor 16 is connected directly to AC source 18 through supply line 30, motor terminal 38 of AC induction motor 16 is connected directly AC source 18 through supply line 32, and motor terminal 40 of AC induction motor 16 is connected directly to AC source 18 through supply line 34.

Alternatively, AC induction motor 16 may be brought to operating speed by providing constant current thereto. As is known, line current $I_A$, $I_B$ and $I_C$ lags the supply voltage $V_A$, $V_B$ and $V_C$ by an angle θ corresponding to the power factor of AC induction motor 16. The line current $I_A$, $I_B$ and $I_C$ to AC induction motor 16 are maintained by maintaining the conduction period of thyristor switches 42, 44 and 46 such that the duration of notch γ is maintained. By maintaining the line currents $I_A$, $I_B$ and $I_C$ to AC induction motor 16 at a predetermined level over a predetermined period of time, the angle θ of the power factor of AC induction motor 16 reduces as AC induction motor 16 accelerates and the back EMF voltages at motor terminals 36, 38 and 40 approaches corresponding source voltages $V_A$, $V_B$ and $V_C$, respectively. It is contemplated that once the back ENF voltages at motor terminals 36, 38 and 40 exceed a predetermined value, corresponding bypass contactors 50, 52 and 54, respectively, are sequentially closed such that motor terminal 36 of AC induction AC induction motor 16 is connected directly to AC source 18 through supply line 30, motor terminal 38 of motor 16 is connected directly to AC source 18 through supply line 32, and motor terminal 40 of AC induction motor 16 is connected directly to AC source 18 through supply line 34.

In certain applications wherein AC induction motor 16 is used for powering various types of pumps for pumping various types of thick fluids, a special ramping of AC induction motor 16 is often desired in order limit variations in the torque provided by AC induction motor 16 as the motor speed is increased. To maintain near constant torque during acceleration of AC induction motor 16 during a so-called "pump start", it is desirable to maintain the angle θ of the power factor of AC induction motor 16. In order to maintain the angle θ of the power factor of AC induction motor 16 constant, the initial duration of notch γ is calculated from a user selected initial torque output T2 for AC induction motor 16. The angle θ between the center point of notch γ and the initial zero cross voltage of each supply voltage $V_A$, $V_B$ and $V_C$ may be calculated. Knowing the center point of notch γ and that the notch will occur each time an associated line current $I_A$, $I_B$ and $I_C$ falls to zero—in another words, at minus γ/2 wherein γ is the new notch width—the thyristor switches 42, 44 and 46 may be fired at a period of γ/2 after the center point θ previously determined. As a result, while the width of notch γ may vary, the angle θ of the power factor of AC induction motor 16 will remain constant.

Alternatively, a "pump start" may by achieved by alpha control. In alpha control, thyristor switches 42, 44 and 46 are fired after a delay of α degrees after the occurrence of zero supply volts at corresponding motor terminals 36, 38 and 40, respectively. While adequate for most applications, alpha control causes a small minority of motors to become unstable.

In accordance with the present invention, in order to provide increased stability during acceleration of AC induction motor 16, the firing angle α may be changed proportionally with changes in the phase lag angle φ which occurs from one cycle to the next. (One complete cycle equaling 360 degrees). As such, the proportional change in the subsequent firing angle α is done according to the relation:

$$\alpha_i = \alpha_{i-1} + P(\phi_i - \phi_{i-1})$$  Equation (1)

wherein $\phi_i$ is the phase lag; $\phi_{i-1}$ is the previous phase lag; P is the proportional gain, typically between 0.8 and 1.2; $\alpha_i$ is the new firing angle, and $\alpha_{i-1}$ is the previous firing angle.

Integral gain is then used to control the average value of the firing angle α by changing it is slowly with time. This is done by adding an additional integral term to equation (1), which becomes:

$$\alpha_i = \alpha_{i-1} + P(\phi_i - \phi_{i-1}) + I(\alpha_{ref} - \alpha_{i-1})$$  Equation (2)

wherein I is the integral gain, and $\alpha_{ref}$ is the desired firing angle.

As a result, if the firing angle α for successive firing is occurring too late in the supply half cycle (i.e. $\alpha_{ref} - \alpha_{i-1} - 0$), then the integral term in equation (2) is negative. This will gradually bring successive firing angles α forward to the desired position. If the firing angle α is occurring too early in the half cycle, then the positive integral term gradually increases α over many firings and takes α to the desired position.

In order to show the effect on notch γ during pump start, equation (2) can be rewritten in terms of successive notch angles γ. This is done by subtracting $\phi_i$ from both sides of equation (2) to give:

$$\alpha_i - \phi_i = \alpha_{i-1} - \phi_i + P(\phi_i - \phi_{i-1}) + I(\alpha_{ref} - \alpha_{i-1})$$  Equation (3)

$$= \alpha_{i-1} - \phi_{i-1} + \phi_{i-1} + P(\phi_i - \phi_{i-1}) +$$

$$I(\alpha_{ref} - \alpha_{i-1})$$

This may be expressed as:

$$\gamma_i = \gamma_{i-1} + (P-1)\Delta\phi_i + I(\alpha_{ref} - \alpha_{i-1}).$$  Equation (4)

wherein $\Delta\phi_i$ is the change $(\phi_i - \phi_{i-1})$ in phase lag angle of successive current zeros.

Equation (4) shows the adjustment in notch γ needed to produce smooth acceleration of AC induction motor 16 to avoid the large torque variations. $\Delta\phi_i$ is the change $(\phi_i - \phi_{i-1})$ in phase lag angle of successive current zeros. In order to increase torque gradually, $\alpha_{ref}$ is progressively reduced over the acceleration period of AC induction motor 16.

Once again, it is contemplated that if the back EMF voltage at motor terminals 36, 38 and 40 exceeds a predetermined value, corresponding bypass contactors 50, 52 and 54, respectively, are sequentially closed such that motor terminal 36 of AC induction motor 16 is connected directly to AC source 18 through supply line 30, motor terminal 38 of AC induction motor 16 is connected directly to AC source 18 through supply line 32, and motor terminal 40 of AC induction motor 16 is connected directly to AC source 18 through supply line 34.

Once AC induction motor 16 is operating at full operating speed and bypass contactors 50, 52 and 54 are closed, it is contemplated to monitor bypass contactors 50, 52 and 54 such that if one or more of such bypass contactors drop out, the corresponding thyristor switch 42, 44 or 46 will fire and maintain the interconnection of AC induction motor 16 to AC source 18 through corresponding supply lines 30, 32 or 34.

Figure 3:
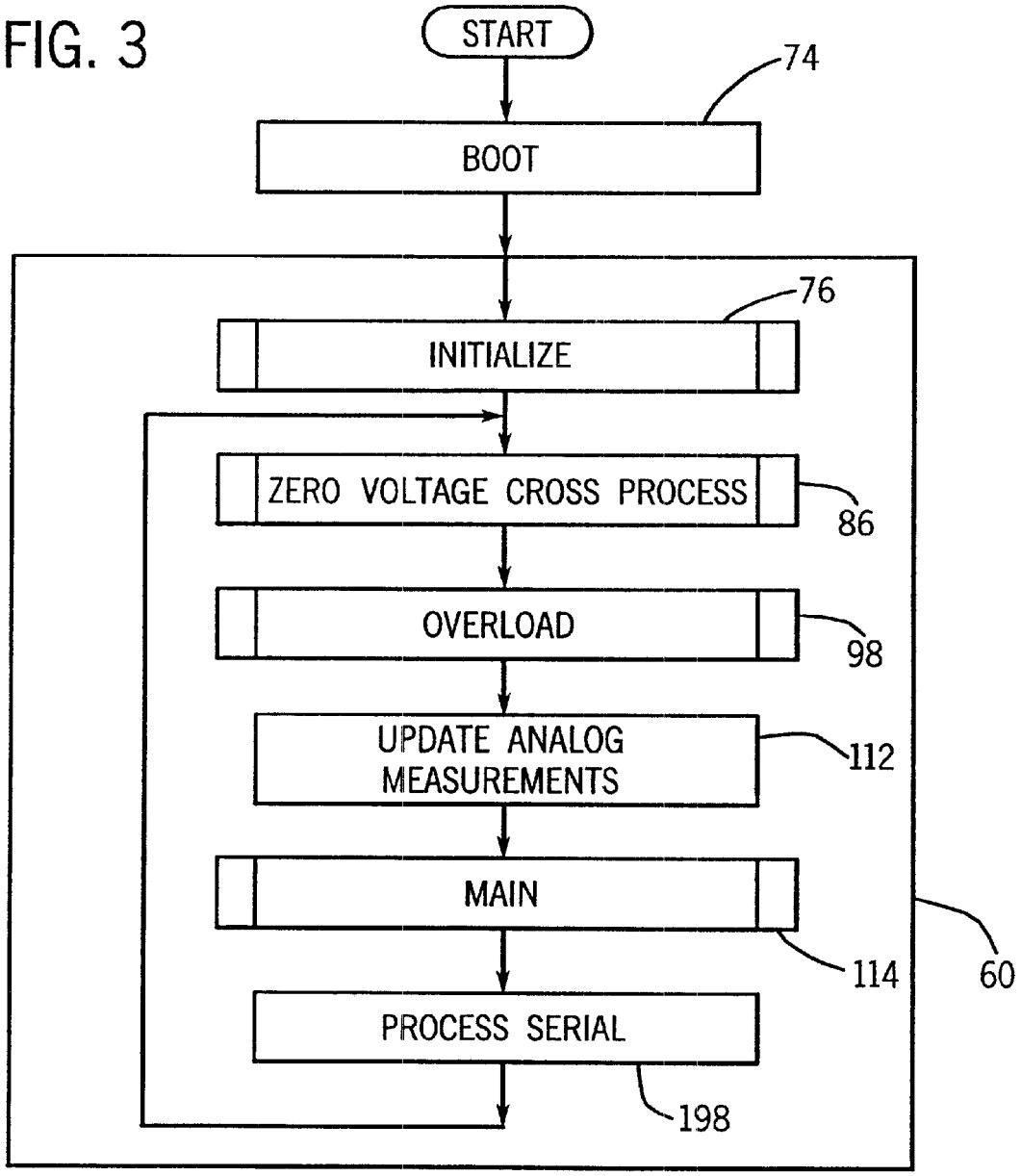

In order for soft starter 14 to function as heretofore described, microprocessor 48 carries out a number of predetermined functions which are incorporated into computer executable instructions 60, FIG. 3. It should be understood that while these functions are described as being implemented in software, it is contemplated that the functions could be implemented in discreet solid state hardware, as well as, the combination of solid state hardware and software.

Referring to FIG. 2a, microprocessor 48 is interconnected to network by transceiver 63. Transceiver 63 includes first and second inputs $T_{XEN}$ and $T_X$ from microprocessor 48 and has one output $R_X$ to microprocessor 48. Transceiver 63 allows microprocessor 48 to transmit and receive signals from the other motor controls of the motor control system 10 over the network. It is contemplated that transceiver 63 be a universal asynchronous receiver/transmitter such as a standard RS485 transceiver.

Microprocessor 48 has a plurality of input signals corresponding to selected parameters heretofore described. These inputs include supply voltages $V_A$, $V_B$ and $V_C$ and the associated line currents $I_A$, $I_B$ and $I_C$. The voltage drops $V_{AD}$, $V_{BD}$ and $V_{CD}$ across thyristor switches 42, 44 and 46, respectively, are also inputted into microprocessor 48. In addition, the bus temperatures $T_A$, $T_B$ and $T_C$ of supply lines 30, 32 and 34, respectively, are inputted into microprocessor 48. The voltages inputted into microprocessor 48 are passed through a voltage divider 64 to reduce the magnitude of the input signals provided to a value within the range of acceptable inputs without damage to the microprocessor 48. The line current signals and the temperature readings are passed through filters 65 to insure accurate readings thereof by the microprocessor 48 and to eliminate noise thereon.

Microprocessor 48 may also include a plurality of programmable inputs 68a–68e and a plurality of outputs 70a–70b. By way of example, input 68a is interconnected to a selection device (not shown) whereby actuation of the selection device enables AC induction motor to be started. Inputs 68b and 68c are interconnected to corresponding selection devices (not shown) whereby actuation of the selection devices starts and stops AC induction motor 16 as hereinafter described. Outputs 70a and 70b may by interconnected to signaling devises (not shown) to signal a fault on AC induction motor 16 or that AC induction motor 16 is up to full operating speed.

Figure 4:
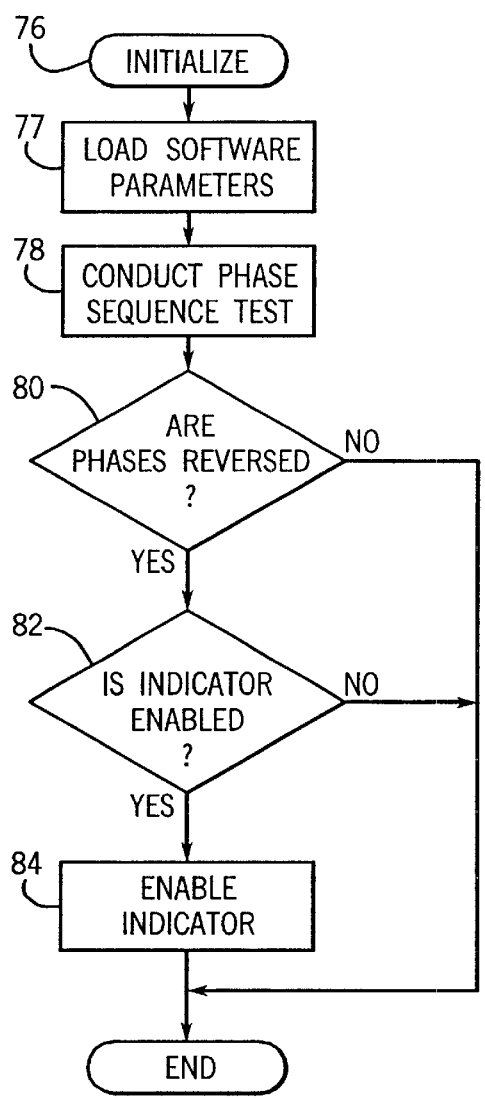
FIG. 4 is a flow chart of the Initialize subroutine for the computer executable instructions of FIG. 3.

Referring to FIG. 3, on activation of microprocessor 48, microprocessor 48 is booted, block 74, and initialized, block 76, in order that microprocessor 48 to execute the computer executable instructions 60. Referring to FIG. 4, during initialization, the microprocessor 48 loads the software parameters, block 77, corresponding to AC induction motor 16 and the parameters received from the other motor controls on the network, as hereinafter described. Supply voltages $V_A$, $V_B$ and $V_C$ on supply lines 30, 32 and 34, respectively, are monitored to determine if supply lines 30, 32 or 34 are incorrectly connected to AC induction motor 16 such that the phase sequence is reversed, block 78. If the phase sequence is not reversed, initialization is completed. Similarly, if the phase sequence is reversed, block 80, but the monitoring of the phase sequence is disabled, block 82, initialization of the microprocessor 48 is completed. However, if monitoring of the phase is enabled, microprocessor 48 terminates the start up of AC induction motor 16 and enables an indicator, block 84, at output 70a as heretofore described.

Figure 5:
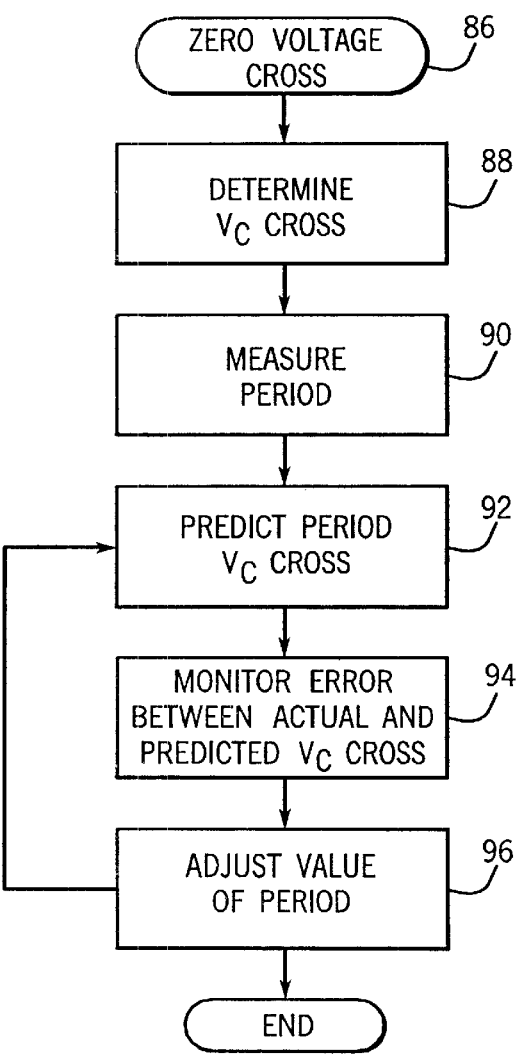
FIG. 5 is a flow chart of the Zero Voltage Cross subroutine for the computer.

Referring to FIG. 3, after completion of initialization, block 76, microprocessor 48 executes the zero voltage cross process, block 86. Referring to FIG. 5, microprocessor 48 determines the initial zero voltage cross of supply voltage $V_C$, block 88. Thereafter, the period of $V_C$ is measured, block 90. Based on the measured period, the period of supply voltage $V_C$ is predicted, block 92. The actual period is monitored to determine any error between the actual period and the predicted period of supply voltage $V_C$, block 94. The actual zero crossing point of supply voltage $V_C$ is compared to the predicted zero crossing point of supply voltage $V_C$, block 94, and the error between the actual and predicted zero voltage cross value of supply voltage $V_C$ is determined. Thereafter, the value of the period for the supply voltage $V_C$ is adjusted in accordance with the previously determined error, block 96. Given the adjusted value of the period of supply voltage $V_C$, the next zero voltage cross of supply voltage $V_C$ is predicted and the process is repeated. The predicted period of supply voltage $V_C$ is used to calculate the periods of supply voltages $V_A$ and $V_B$ which, in turn, is used to determine the proper firing angle for firing thyristor switches 42, 44 and 46. The periods of $V_A$ and $V_B$ are calculated by adding 120 degrees or subtracting 120 degrees, respectively, from the period of $V_C$.

Figure 6:
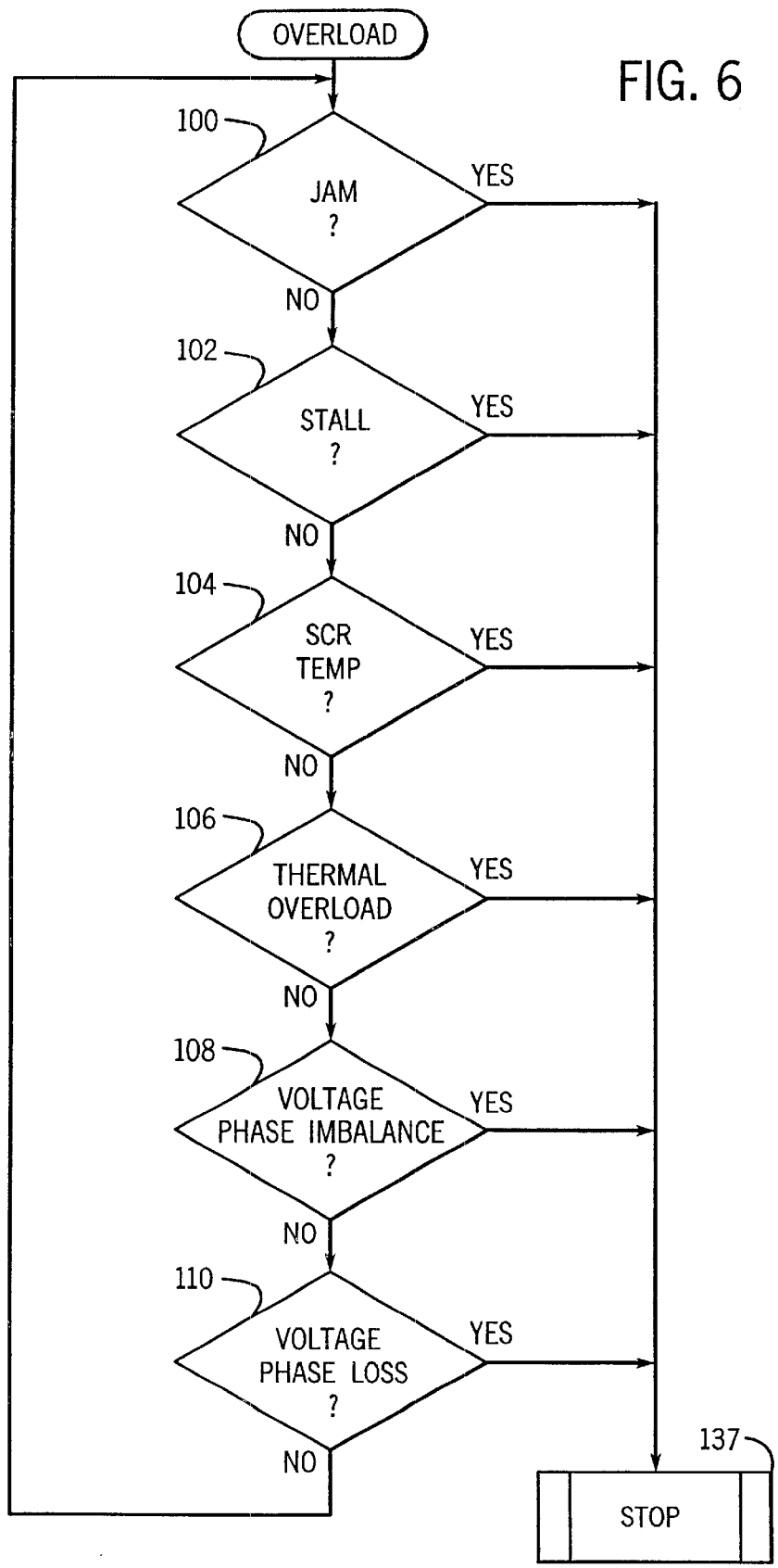
FIG. 6 is a flow chart of the Overload subroutine for the computer executable instructions of FIG. 3.

As best seen in FIG. 3, in response to its inputs, microprocessor 48 determines whether an overload condition, block 98, is present on AC induction motor 16. Referring to FIG. 6, microprocessor 48 determines if a jam condition, block 100, is on AC induction motor 16. A jam condition exists on AC induction motor 16 if, at full operating position, the sum of the line currents $I_A$, $I_B$ and $I_C$ exceeds a predetermined level over a predetermined period of time. If a jam condition is detected, AC induction motor 16 is stopped by microprocessor 48 as hereinafter described.

In addition, microprocessor 48 determines if AC induction motor 16 has stalled, block 102. A stall condition occurs if, as AC induction motor 16 is accelerating, the sum of the line currents $I_A$, $I_B$ and $I_C$ is above a predetermined level over the predetermined period of time. If a stall condition exists during acceleration of AC induction motor 16, microprocessor 48 stops AC indiction motor 16 as hereinafter described.

The bus temperatures $T_A$, $T_B$ and $T_C$ of supply lines 30, 32 and 34, respectively, are monitored with microprocessor 48, block 104, such that if bus temperatures $T_A$, $T_B$ or $T_C$ exceed a predetermined temperature over a predetermined period of time, microprocessor 48 stops AC induction motor 16 as hereinafter described.

Microprocessor 48 further monitors for a thermal overload condition, block 106, on AC induction motor 16. A thermal overload occurs if the RMS values of the supply voltage or the line current on a single supply line 30, 32 or 34 exceeds a predetermined value over a predetermined period of time. If a microprocessor 48 depicts a thermal overload condition on AC induction motor 16, microprocessor 48 stops AC induction motor 16, as hereinafter described.

In the Overload subroutine, microprocessor 48 also monitors if a phase imbalance has occurred on supply lines 30, 32 or 34, block 108. In order to determine whether a phase imbalance has occurred. the RMS values of the supply voltages $V_A$, $V_B$ and $V_C$ are compared to a predetermined value such that a drop in a supply voltage $V_A$, $V_B$ or $V_C$ of a predetermined percentage below the normal RMS line voltage results in a determination of a phase imbalance by microprocessor 48. If a phase imbalance is detected by microprocessor 48, AC induction motor 16 is stopped as hereinafter described.

Microprocessor 48 also determines if the RMS voltage of supply voltages $V_A$, $V_B$ or $V_C$ drops below a predetermined RMS line voltage, for example, below 50 percent of the normal RMS line voltage, block 110. If the RMS voltage of supply voltages $V_A$, $V_B$ or $V_C$ drops below the predetermined RMS line voltage over a predetermined time, a phase loss has occurred. If a phase loss is detected by microprocessor 48, AC induction motor 16 is stopped by microprocessor 48 as hereinafter described.

As best seen in FIG. 6, microprocessor 48 continues to monitor for overload conditions on motor 16 during operation of soft starter 14. If an overload condition, as heretofore described, is present on AC induction motor 16, microprocessor 48 enables output 70a to provide a signal to a user and may also provide signals to the other motor control over the network, as hereinafter described.

As best seen in FIG. 3, microprocessor 48 repeatedly updates the analog measurements or inputs to microprocessor 48, block 112. Using these inputs, microprocessor 48 starts, stops and controls AC induction motor 16 in the Main subroutine 114 of computer executable instructions 60.

Figure 7:
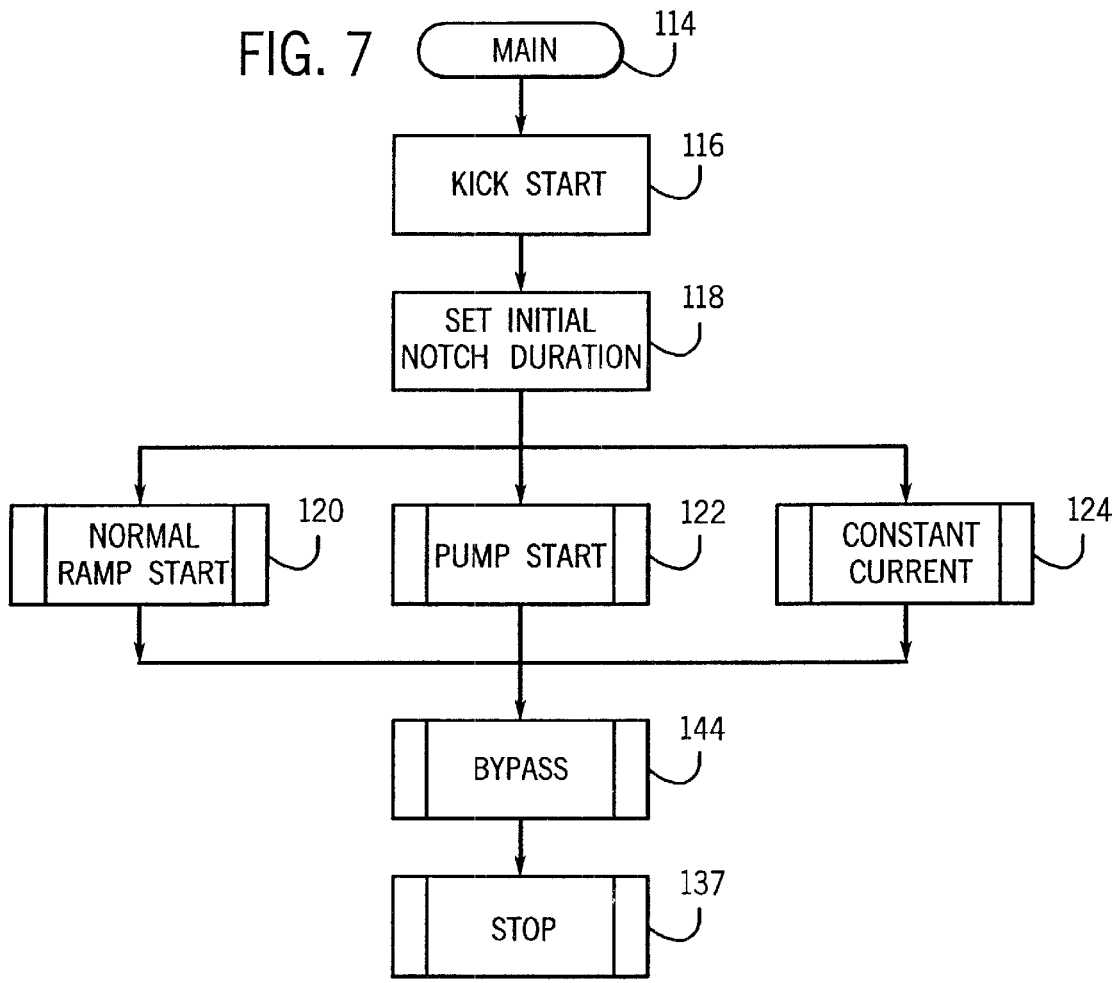
FIG. 7 is a flow chart of the Main subroutine for the computer executable instructions of FIG. 3.
Figure 8:
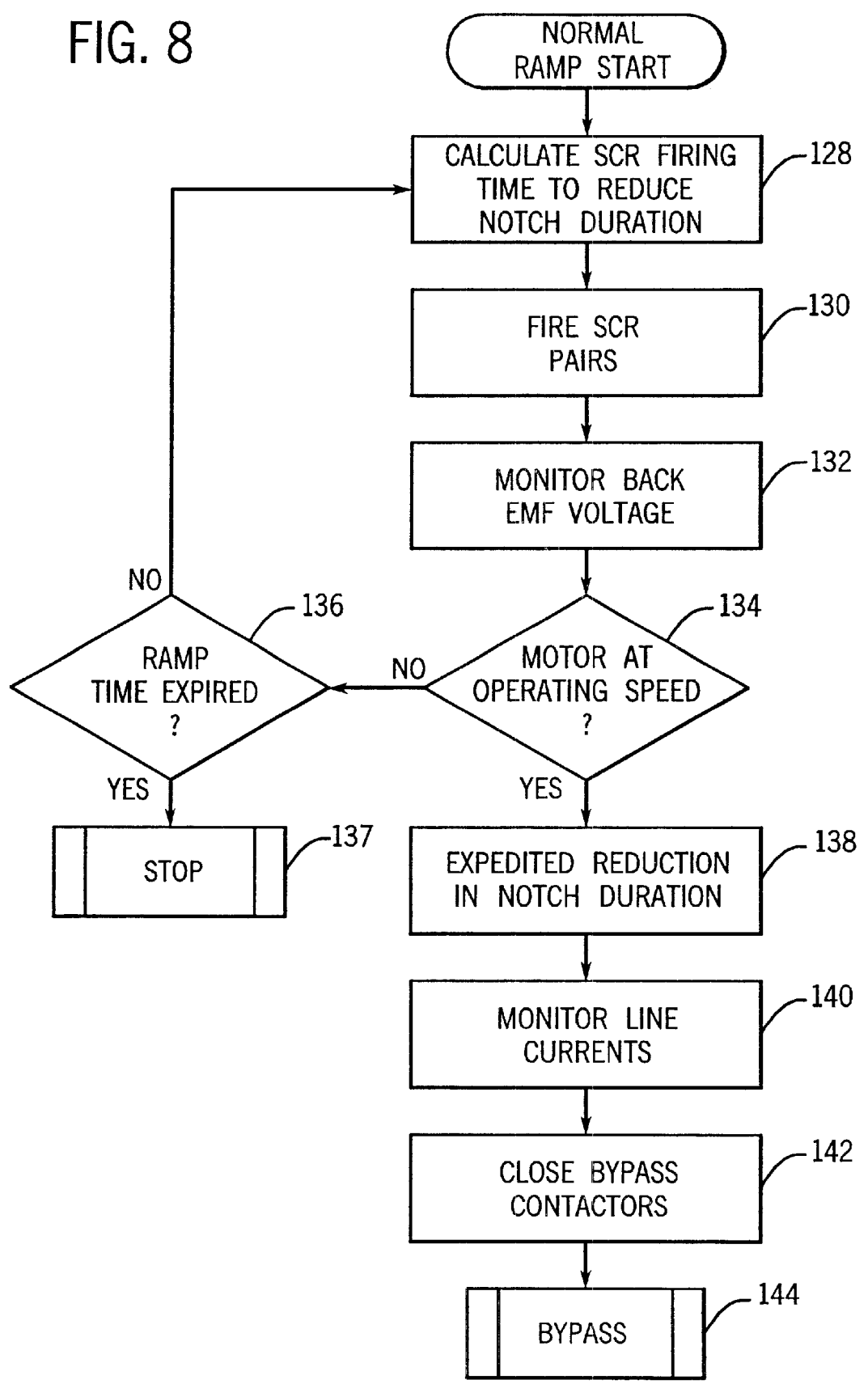
FIG. 8 is a flow chart of the Normal Ramp Start subroutine of the Main subroutine of FIG. 7.
Figure 22:
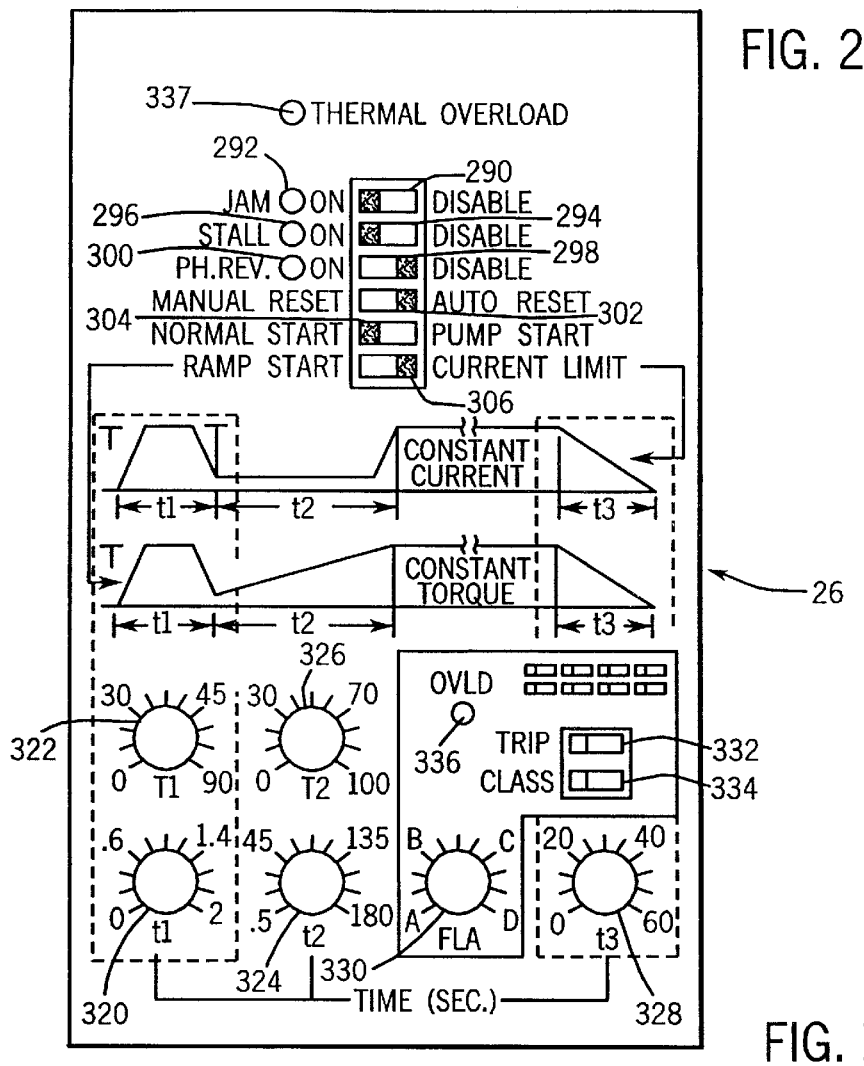
FIG. 22 is a front elevational view of an interface module for the motor control system for the present invention.

Referring to FIGS. 7 and 22, in order to start AC induction motor 16, an initial application of voltage may be provided thereto in order to overcome the inertia of AC induction motor 16. In order to "kick start" AC induction motor 16, block 116, a user selects a time t1 for application of voltage to and a torque T1 to be generated by AC induction motor 16. In response to the user selected time t1 and the user selected torque T1 for the kick start, microprocessor 48 calculates a corresponding notch width γ in order that AC induction motor 16 may provides the user selected torque T1 substantially thoughout the predetermined time period t1. If the user desires not to start AC induction motor 16 with a kick start, a user sets the user selected time t1 for the kick start to be equal to zero. Upon completion of the kick start, block 116, microprocessor 48 adjusts the notch width γ to correspond to a user selected starting torque T2, block 118. Thereafter, microprocessor 48 starts AC induction motor 48 in accordance with a user select method in order to bring AC induction motor 16 to full operating speed. A user may select to start AC induction motor 16 by a normal ramp start, block 120, a pump start, block 122, or a constant current start, block 124.

During normal ramp start, block 120, AC induction motor 16 is brought to full operating speed by gradually increasing line currents $I_A$, $I_B$ and $I_C$ over a user selected period of time t2. Based on a user selected initial torque setting T2, microprocessor 48 calculates the initial line currents $I_A$, $I_b$ and $I_C$ necessary for AC induction motor 16 to generate such a torque. The initial line currents $I_A$, $I_B$ and $I_C$ correspond to an initial width of notch γ. Microprocessor 48 generates firing signals $S_A$, $S_B$ and $S_C$ to fire thyristor switches 42, 44 and 46, respectively, at appropriate times to generate notch γ. The line currents $I_A$, $I_B$ and $I_C$ are ramped up by gradually increasing the conduction period of thyristor switches 42, 44 and 46, respectively, by decreasing the duration of notches γ in the terminal voltages seen at motor terminals 36, 38 and 40, respectively.

Thyristor switches 42, 44, and 46 are fired in pairs, block 130, to provide a path for the line current into and out of AC induction motor 16. Thereafter, the back EMF voltage is monitored, block 132, as heretofore described, to determine if AC induction motor 16 is rotating at full operating speed. If AC induction motor 16 is not at full operating speed, block 134, and the user selected ramp time t2 has not expired, block 136, microprocessor 48 calculates the next firing angle α of thyristor switches 42, 44 and 46 in order to further reduce the duration of notch γ and fires thyristor switches 42, 44 and 46, accordingly, as heretofore described. If the ramp time t2 has expired and the AC induction motor 16 is not at operating speed, AC induction motor 16 is stopped, block 137, as hereinafter described.

If AC induction motor reaches full operating speed within a user selected ramp time t2, microprocessor 48 expeditiously the reduction in the duration of notch γ, block 138, while monitoring line currents $I_A$, $I_B$ and $I_C$, block 140. If line currents $I_A$, $I_B$ and $I_C$ are below the full load amperes of AC induction motor 16, microprocessor 48 generates an output signal $B_A$, $B_B$ and $B_C$ to close bypass contactors 50, 52 and 54, respectively, block 142. With bypass contactors 50,. 52 and 54 closed, the bypass subroutine, block 144, is executed.

Figure 9:
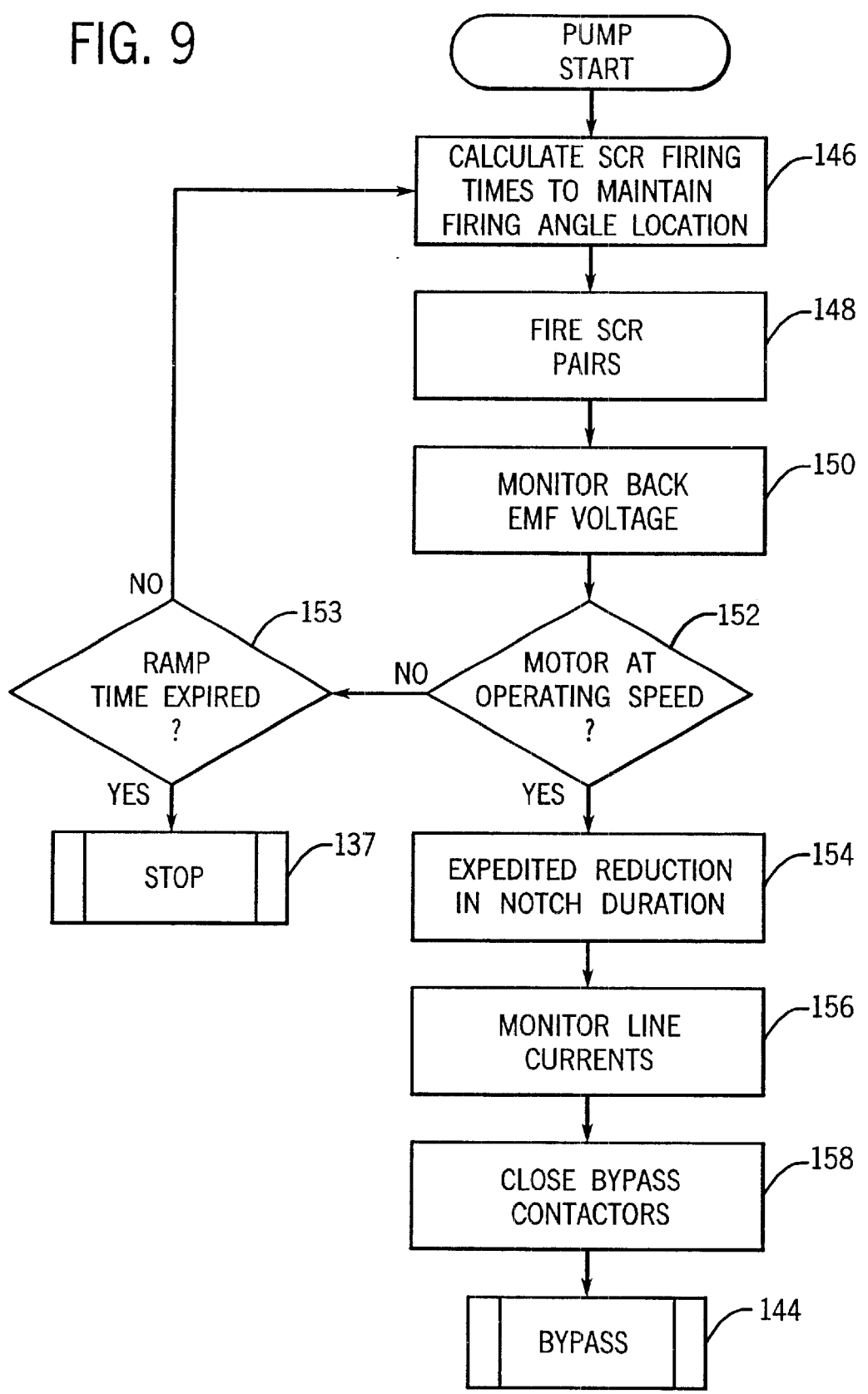
FIG. 9 is a flow chart of the Pump Start subroutine of the Main subroutine of FIG. 7.

Alternatively, AC induction motor 16 may be started in the "pump start," block 122. Referring to FIG. 9, during pump start, block 122, AC induction motor 16 generates relatively constant or gradually increasing torque as it is gradually accelerated to fill operating speed over a user selected period of time t2. Based on a user selected initial torque setting T2, microprocessor 48 calculates the initial line currents $I_A$, $I_B$ and $I_C$ necessary for AC induction motor 16 to generate such a torque. The initial line currents $I_A$, $I_B$ and $I_C$ correspond to an initial width of notch γ. Microprocessor 48 generates firing signals $S_A$, $S_B$ and $S_C$ to fire thyristor switches 42, 44 and 46, respectively, at appropriate times to generate notch γ. Firing angle α of thyristor switches 42, 44 and 46 is calculated as heretofore described, block 146, by microprocessor 48 so as to maintain the torque generated by AC induction motor 16.

As previously described, thyristor switches 42, 44, and 46 must be fired in pairs, block 148, to provide a path for the line current into and out of AC induction motor 16. Thereafter, the back EMF voltage is monitored, block 150, as heretofore described, to determine if AC induction motor 16 is rotating at full operating speed. If AC induction motor 16 is not at full operating speed, block 152, and the user selected ramp time t2 has not expired, block 153, microprocessor 48 calculates the next firing angle α of thyristor switches 42, 44 and 46 as heretofore described, block 146, so as to maintain the torque generated by AC induction motor 16 and the process is repeated. If the ramp time t2 has expired and the AC induction motor 16 is not at operating speed, AC induction motor 16 is stopped, block 137, as hereinafter described.

If AC induction motor 16 reaches full operating speed within a user selected ramp time t2, microprocessor 48 expeditiously reduces the duration of notch γ, block 154, while monitoring line currents $I_A$, $I_B$ and $I_C$ block 156. If line currents $I_A$, $I_B$ and $I_C$ are below the full load amperes of AC induction motor 16, microprocessor 48 generates an output signal $B_A$, $B_B$ and $B_C$ to close bypass contactors 50, 52 and 54, respectively, block 158. With bypass contactors 50, 52 and 54 closed, the bypass subroutine, block 144, is executed.

Figure 10:
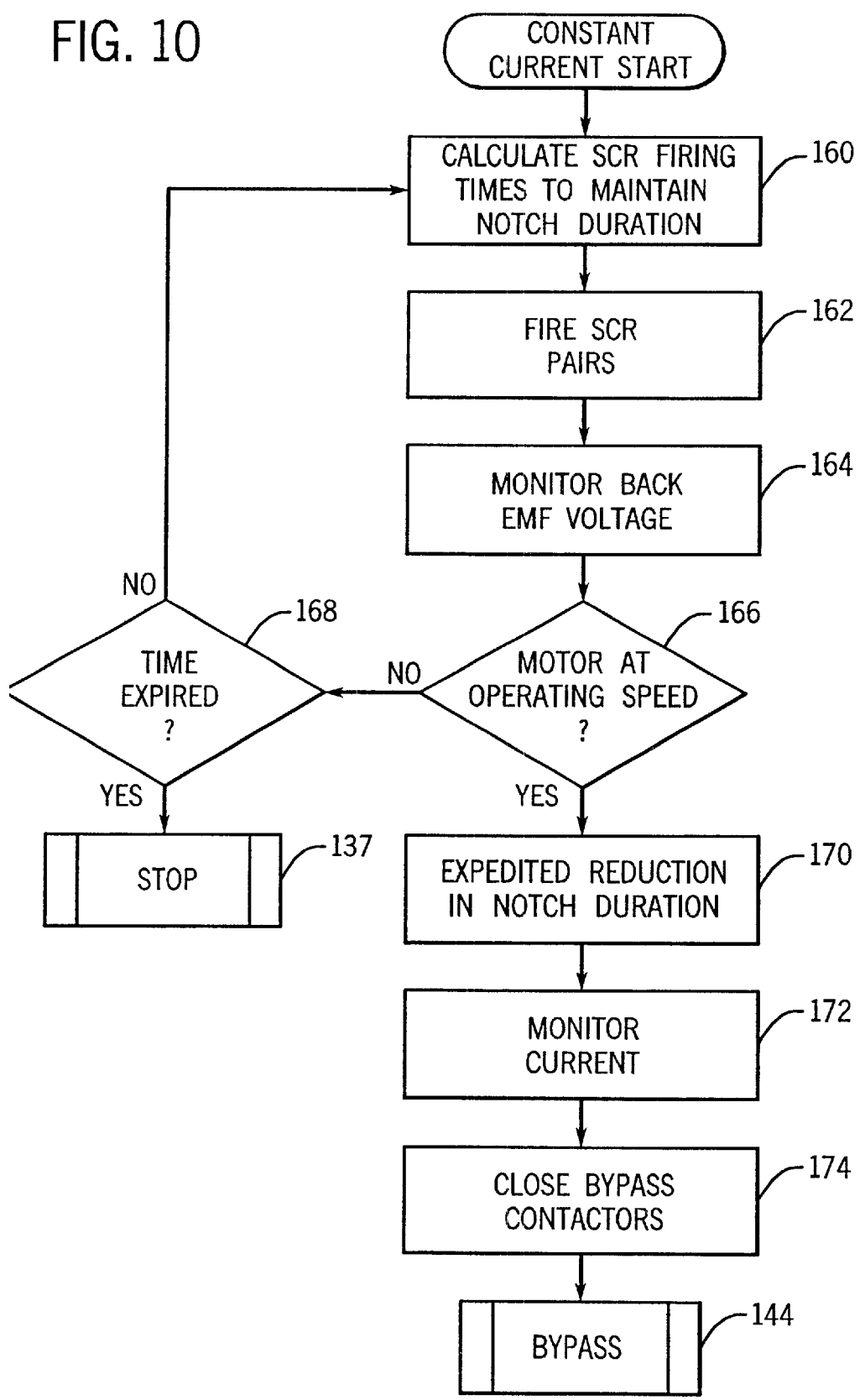
FIG. 10 is a flow chart of the Constant Current Start subroutine of the Main subroutine of FIG. 7.

A user may select to start AC induction motor 16 by applying a constant current thereto, block 124. Referring to FIG. 10, during a constant current start, block 124, a. generally constant current is supplied to AC induction motor 16 to accelerate the AC induction motor 16 to full operating speed over a user selected period of time t2. Based on a user selected initial torque setting T2, microprocessor 48 calculates the initial line currents $I_A$, $I_B$ and $I_C$. In order to maintain constant line currents $I_A$, $I_B$ and $I_C$ to AC induction motor 16, the conduction period of thyristor switches 42, 44 and 46 and hence, the duration of notch γ must be maintained. As previously described, the line currents $I_A$, $I_B$ and $I_C$ correspond to a width of notch γ. As a result, microprocessor 48 calculates the firing time α to maintain the duration of notch γ, block 160, and generates firing signals $S_A$, $S_B$ and $S_C$ to fire thyristor switches 42, 44 and 46, respectively, at appropriate times to generate notch γ, block 162.

As previously described, thyristor switches 42, 44, and 46 must be fired in pairs to provide a path for the line current into and out of AC induction motor 16. Thereafter, the back EME voltage is monitored, block 164, as heretofore described, to determine if AC induction motor 16 is rotating at full operating speed. If AC induction motor 16 is not at full operating speed, block 166, and the user selected ramp time t2 has not expired, block 168, microprocessor 48 calculates the next firing angle α of thyristor switches 42, 44 and 46 as heretofore described, block 160, so as to maintain the supplied to AC induction motor 16 and the process is repeated. If the ramp time t2 has expired and the AC induction motor 16 is not at operating speed, AC induction motor 16 is stopped, block 137, as hereinafter described.

If AC induction motor 16 reaches full operating speed within a user selected ramp time t2, microprocessor 48 expeditiously reduces the duration of notch y, block 170, while monitoring line currents $I_A$, $I_B$ and $I_C$, block 172. If line currents $I_A$, $I_B$ and $I_C$ are below the full load amperes of AC induction motor 16, microprocessor 48 generates an output signal $B_A$, $B_B$ and $B_C$ to close bypass contactors 50, 52 and 54, respectively, block 174. With bypass contactors 50,. 52 and 54 closed, the bypass subroutine, block 144, is executed.

Figure 11:
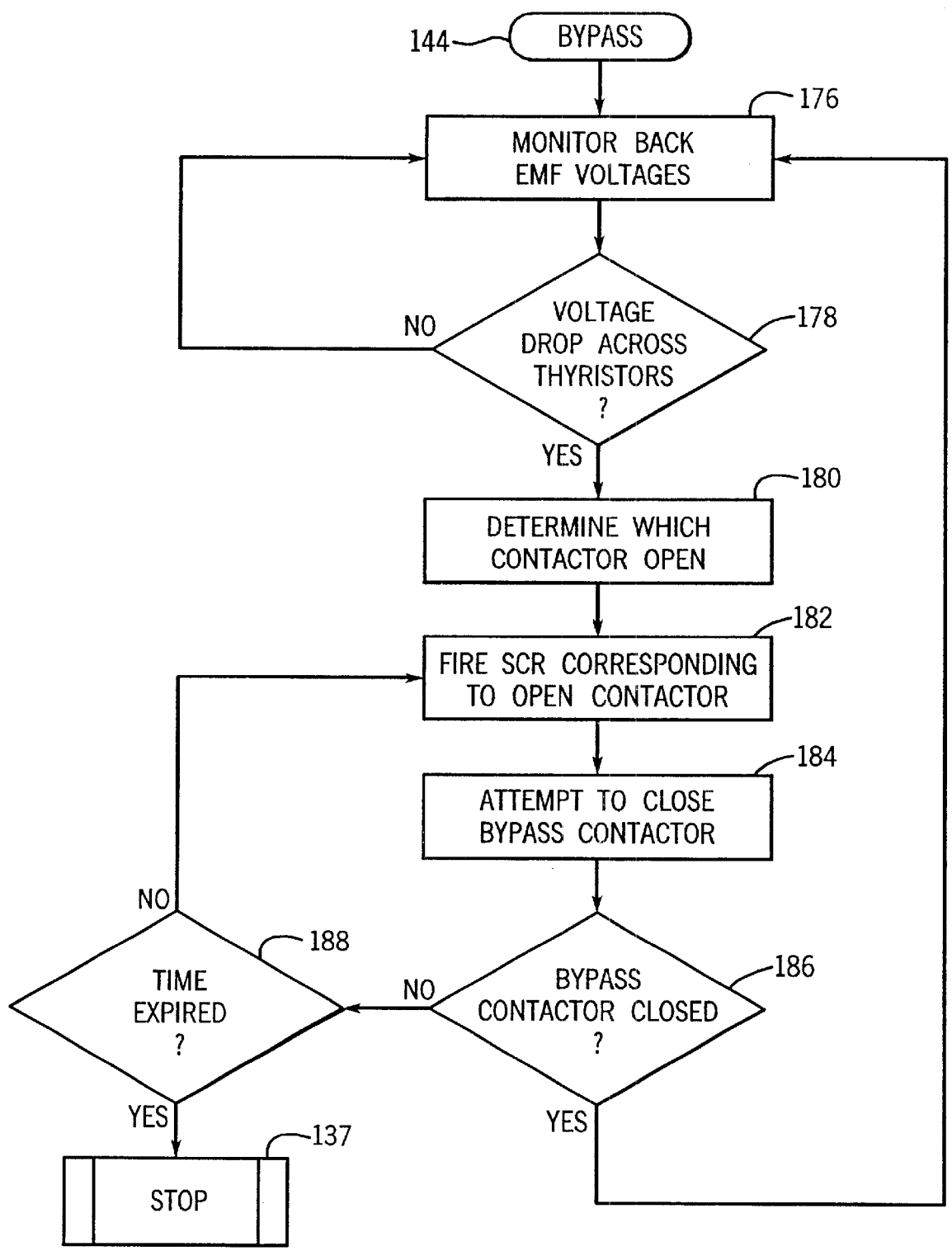
FIG. 11 is a flow chart of the Bypass subroutine of the Main subroutine of FIG. 7.

Referring to FIG. 11, in bypass, microprocessor 48 monitors the back EMF voltages, block 176. If a voltage drop $V_{AD}$, $V_{BC}$ or $V_{CD}$ is detected across thyristor switches 42, 44 or 46, respectively, a bypass contactor 50, 52 or 54, respectively has opened. By sensing the existence of a voltage $V_{AD}$, $V_{BC}$ or $V_{CD}$, across corresponding thyristor switch 42, 44 or 46, respectively, microprocessor 48 determines which contactor 50, 52 or 54 is opened, block 180. Immediately upon sensing the voltage drop, microprocessor 48 transmits a signal $S_A$, $S_B$ or $S_C$ to fire the thyristor switch 42, 44 and/or 46, respectively, corresponding to the open bypass contactor 50, 52 or 54, respectively, block 182. Thereafter, microprocessor 48 transmits a signal $B_A$, $B_B$ or $B_C$ to corresponding open bypass contactor 50, 52, or 54, respectively, attempting to reclose the open bypass contactor, block 184. If the open bypass contactor 50, 52, or 54 closes, block 186, AC induction motor 16 continues to rotate at full operating speed and microprocessor 48 returns to monitoring the back EMF voltage, block 176, in an attempt to determine if one of the bypass contactors opens.

In the event that the open bypass contactor has not closed during and a predetermined time period, block 188, has not expired, microprocessor 48 continues to fire the thyristor switch 42, 44, or 46 corresponding to the open bypass contactor 50, 52 or 54 in an attempt to reclose the same. If the open bypass contactor 50, 52 or 54 cannot be closed within a predetermined period of time, AC induction motor 16 is stopped, block 137.

Figure 12:
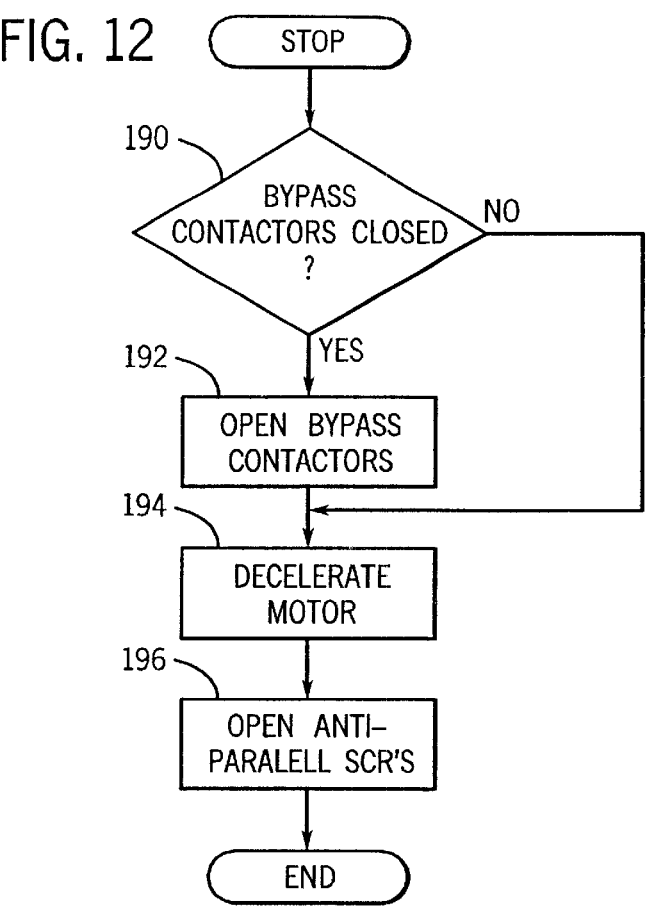
FIG. 12 is a flow chart of the Stop subroutine of the Main subroutine of FIG. 7.

Referring to FIG. 12, in order to stop AC induction motor 16 in response to a user command or a predetermined condition as heretofore described, microprocessor 48 initially determines whether the bypass contactors 50, 52 and 54 are closed, block 190, by sensing the existence of voltage drops $V_{AD}$, $V_{BD}$, and $V_{CD}$ across thyristor switches 42, 44 and 46, respectively. If bypass contactors 50, 52 and 54 are closed, microprocessor 48 transmits signals $B_A$, $B_D$ and $B_C$ to open bypass contactors 50, 52 and 54, respectively, block 192, such that as soon as bypass contactors 50, 52 and 54 open, voltage drops $V_{AD}$, $V_{BD}$, and $V_{CD}$ are detected by microprocessor 48. Thereafter, microprocessor 48 immediately transmits signals $S_A$, $S_B$ and $S_C$ to fire the thyristor switches 42, 44 and 46, respectively. Once the bypass contactors 50, 52 and 54 are opened, AC induction motor 16 is gradually decelerated by opening notch y in supply voltages $V_A$, $V_B$ and $V_C$ over a user selected period of time t3. After the user selected period of time t3, all thyristor switches 42, 44 and 46 are opened, block 196, such that no current or voltage is applied to AC induction motor 16. Thereafter, AC induction motor 16 stops under its load. In the event the user does not wish to gradually stop AC induction motor 16, the firing of thyristor switches 42, 44 and 46 to gradually open notch y in supply voltages $V_A$, $V_B$ and $V_C$ is eliminated by setting the user selected period of time, t3 to zero.

Referring back to FIG. 3, it is contemplated for microprocessor 48 of AC induction motor 16 to communicate with the other motor controls interconnected to the network for transmitting and receiving packets of information for reason hereinafter described. Microprocessor 48 periodically transmits output signals $T_{XEN}$ and $T_X$ onto the network through transceiver 63 and loads inputs signal $R_X$ received by transceiver 63 from the other motor control interconnected to the network, block 198.

Figure 14:
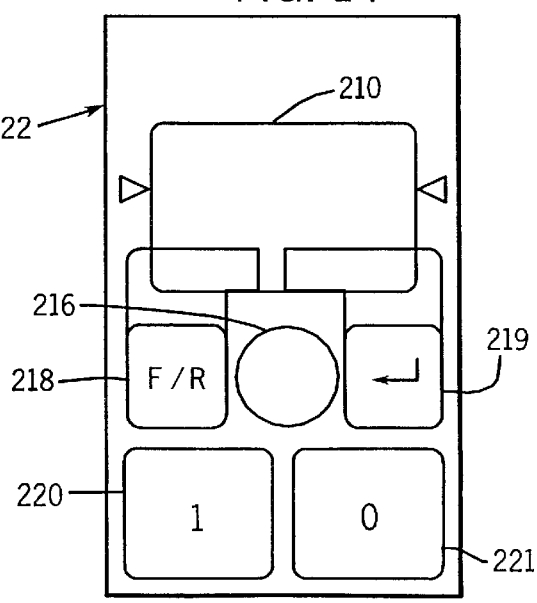
FIG. 14 is a front elevational view of a data interface module for the motor control system of the present invention.
Figure 15:
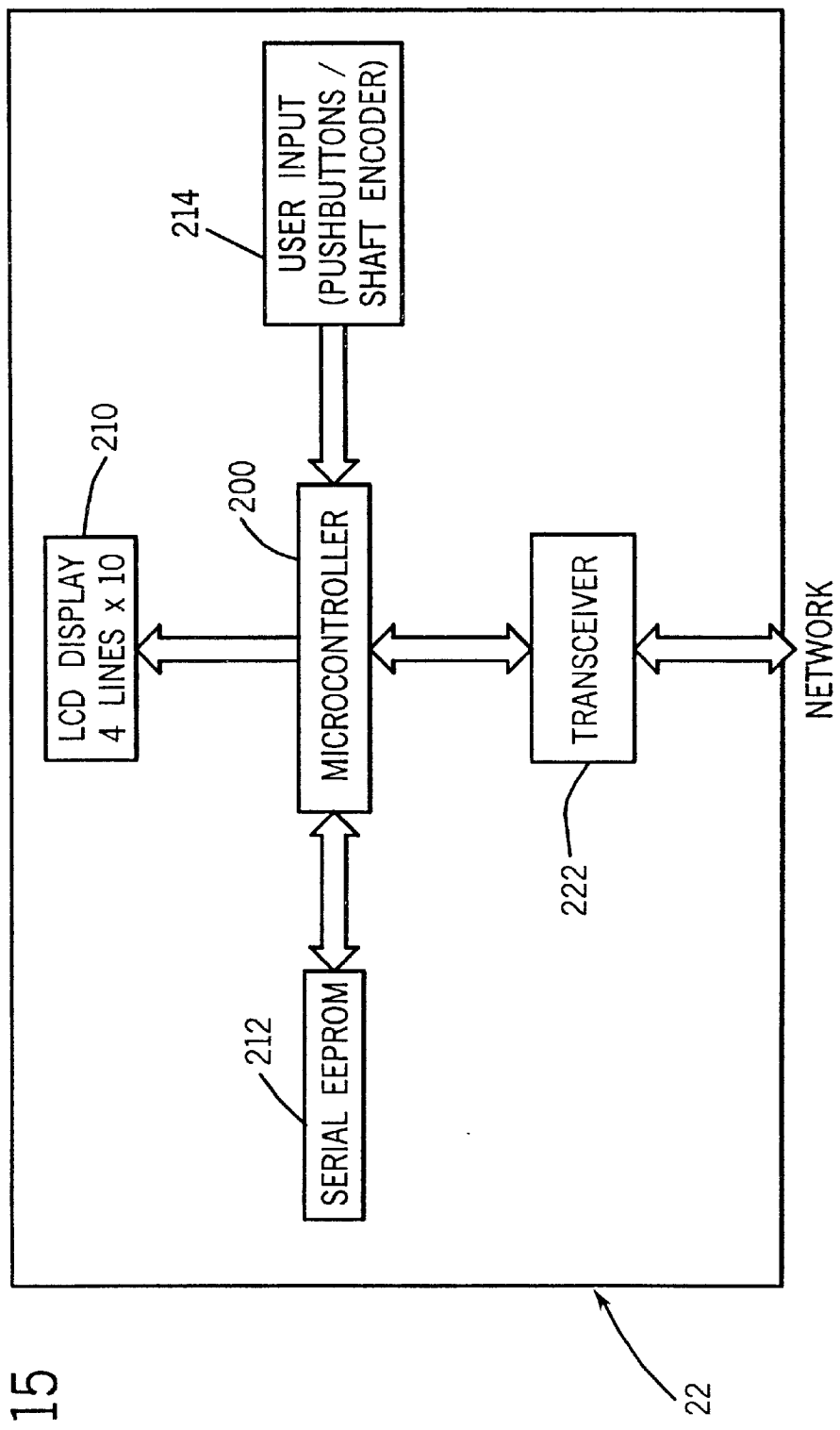
FIG. 15 is a schematic of the data interface module of FIG. 14.

Referring to FIGS. 14–15, button module 28 includes a micro-controller 200 interconnected to an LCD display 210. It is contemplated that LCD display 210 be a standard four line by ten character display. Button module 28 further includes a serial EEPROM 212 interconnected to micro-controller 200 and a plurality of user input devices generally designated by the reference number 214. In the preferred embodiment, seen in FIG. 16, user input devices 214 include a shaft encoder 216 and four pushbutton switches 218–221.

Micro-controller 200 is interconnected to the network by a transceiver 222. It is contemplated that transceiver 222 be a universal asynchronous receiver/transmitter such as a standard RS485 transceiver which allows micro-controller 200 to send and receive packets of information.

Figure 16:
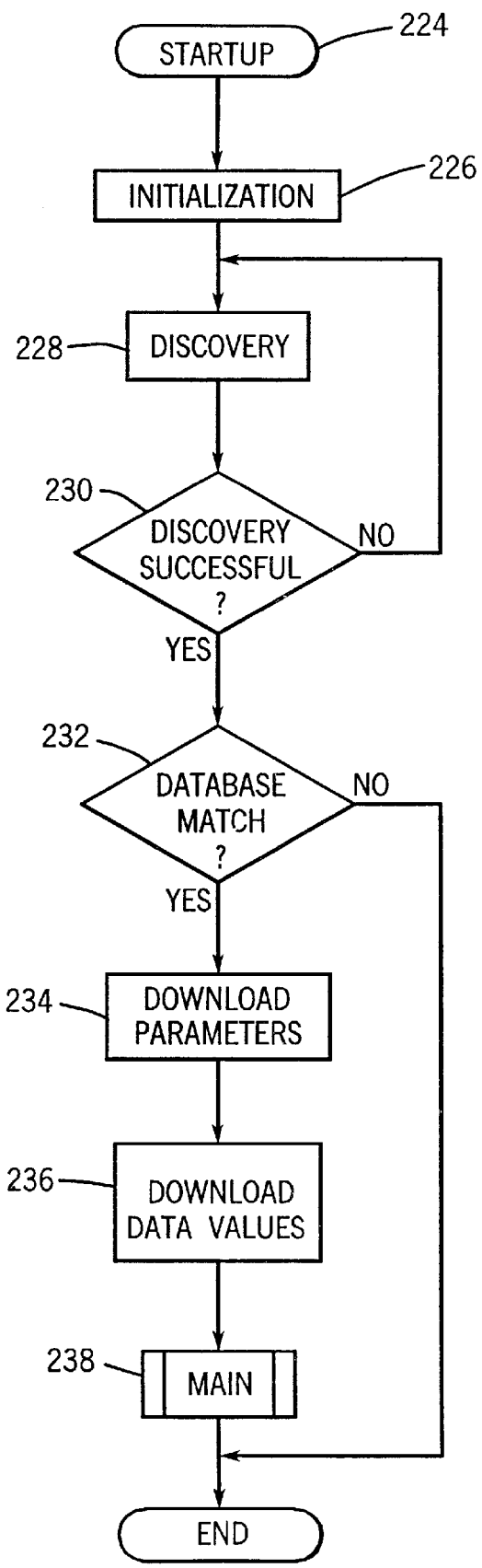
FIG. 16 is a flow chart of computer executable instructions for the micro-controller of the data interface of FIG. 15.

Referring to FIG. 16, a flow chart for the executionable instructions stored on micro-controller 200 is provided. At start up, block 224, the micro-controller 200 initializes the items interconnected thereto and begins a discovery process, block 228, in order to transmit its identity to the other motor controls interconnected to the network and to discover the other motor controls interconnected to the network. Micro-controller 200 transmits a discovery signal onto the network through transceiver 222 and awaits a reply from the other motor controls. Thereafter, micro-controller 200 awaits until discovery is successful, block 230. If discovery is not successful, the process is repeated. However, if discovery is successful, micro-controller 200 will send a request for a parameter structure, block 232 from the predominant peer motor drive, e. g. self-starter 14, of motor control system 10. The parameter structure is a list of information defining software usage of a single motor drive parameter.

If the parameter structure information does not correspond to a preprogrammed database for the predominant peer motor drive, soft starter 14, the executable instructions on micro-controller 200 will end since there was no database match, block 232. However, if the database is matched, then the parameter structure information will be downloaded, block 234, by micro-controller 200 and stored in the serial EEPROM 212. Once the parameter structure information has been successfully downloaded, the data values associated with these parameters are also downloaded, block 236, and stored in RAM. After these steps have been completed, the executable instructions of micro-controller 200 vector to the Main subroutine.

Referring to FIG. 19, in the Main subroutine, block 238, micro-controller 200 scans the input devices (shaft encoder 216 and pushbuttons 218–221) to determine if any user action has taken place, block 240. If a change is detected, block 242, micro-controller 200 executes the micro-controller executable instructions associated with each input device, FIGS. 17–21.

Figure 18:
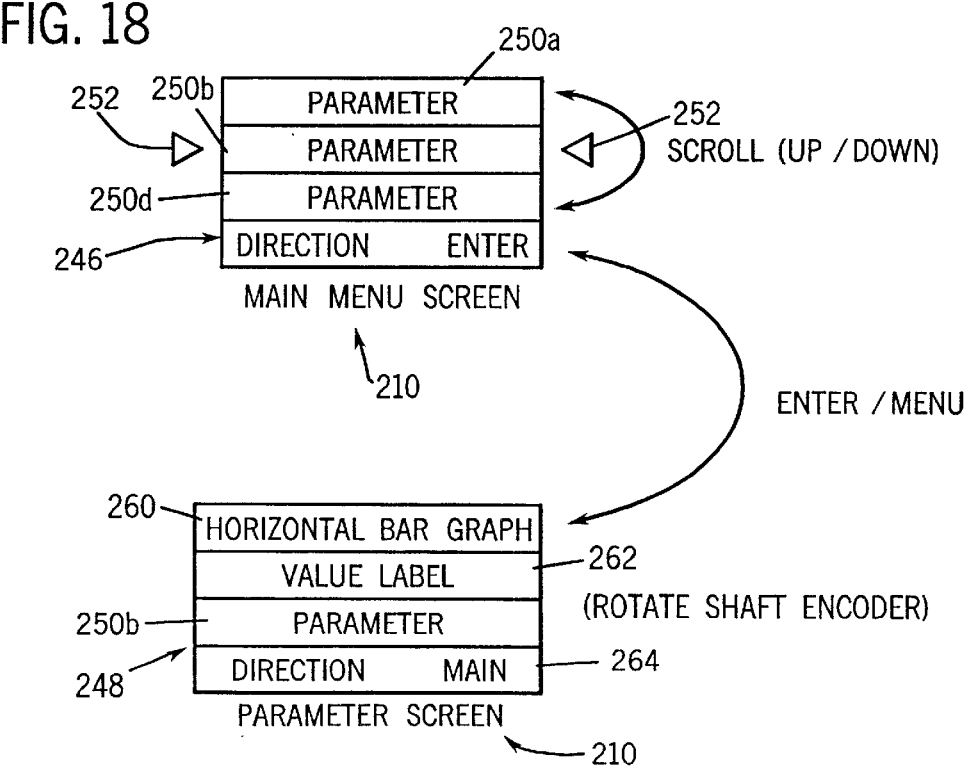
FIG. 18 is a schematic of the screens displayed by the data interface module of FIG. 14.
Figure 17:
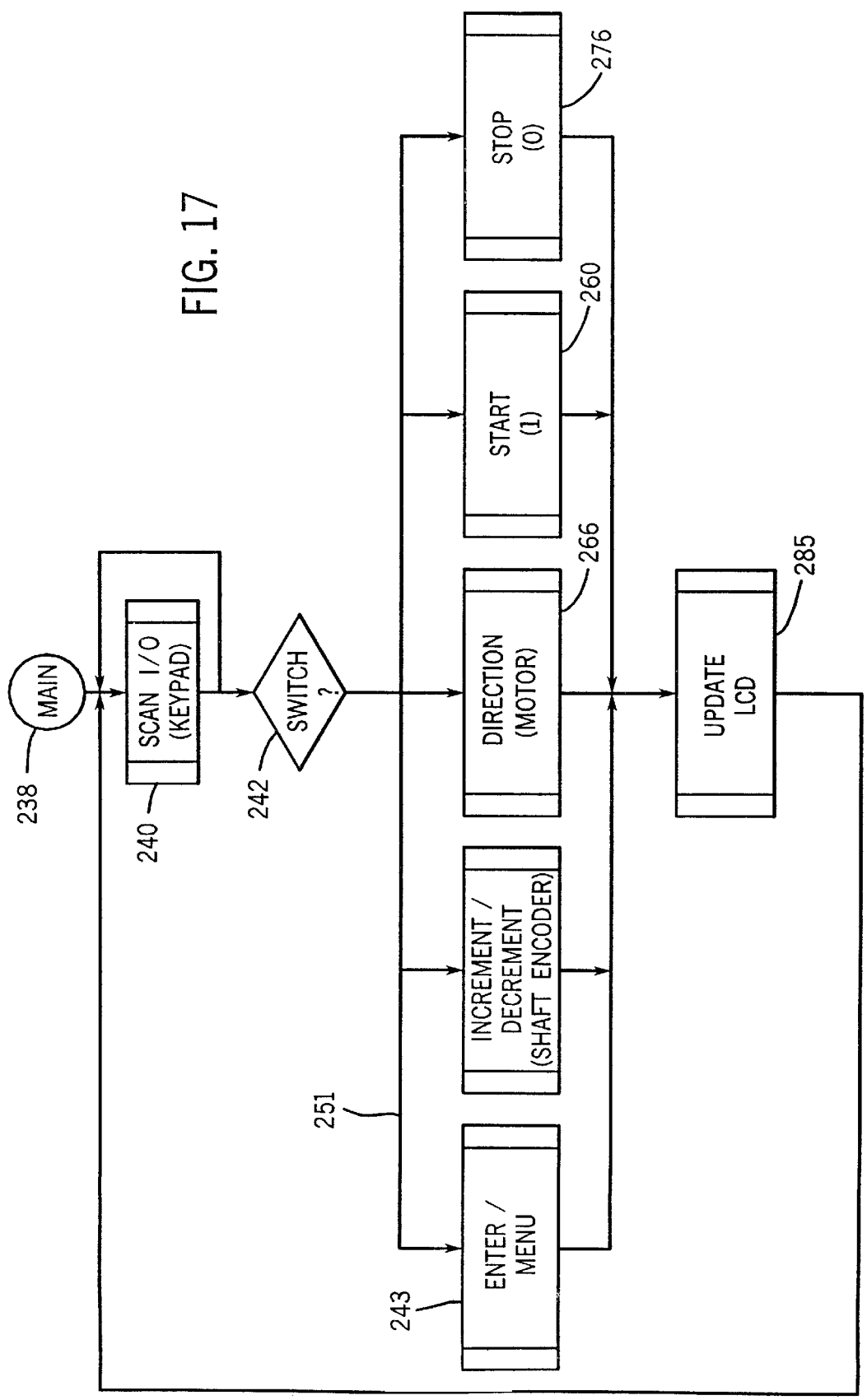
FIG. 17 is a flow chart of the Main subroutine for the computer executable instructions of FIG. 16.
Figure 20:
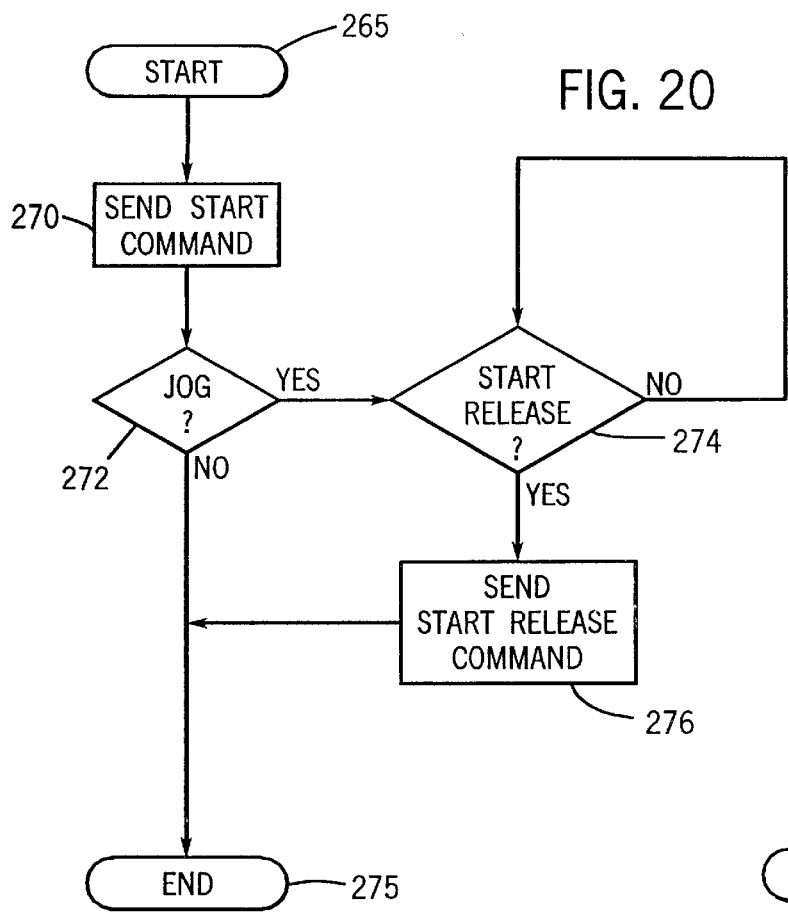
FIG. 20 is a flow chart of the Start subroutine of the computer executable instructions of FIG. 16.

The Enter/Menu subroutine, block 243, is initiated by a user depressing the "enter/menu" pushbutton 219. Referring to FIGS. 17–18, by depressing the enter/menu pushbutton 219, the display on LCD display 210 is toggled between a main menu screen 246 and a parameter screen 248. After start up, the main menu screen 246 is displayed until the enter/menu pushbutton 219 is depressed. In the main menu screen, three parameters 250a, 250b and 250c are displayed. Arrow heads 252 are directed toward the middle displayed parameter 250b. The lower right hand corner of the main menu screen displays the word "enter," while the lower left hand corner of the screen displays the direction of AC induction motor 16. It is contemplated that by rotating shafting encoder 216, micro-controller 200 will perform the Increment/Decrement subroutine, block 251. In the Increment/Decrement subroutine, FIG. 19, if LCD is displaying the main menu screen, block 265, and shaft encoder 216 is rotated, the main menu screen 246 will scroll through the list of parameters stored in serial EEPROM 212, block 267.

By depressing enter/menu pushbutton 219, the LCD display 210 will toggle to the parameter screen corresponding to the parameter 250b aligned with arrow heads 252. In the parameter screen 248, the top line 260 of the LCD display 210 displays a horizontal bar graph corresponding to the present value of parameter 248. The second line 262 displays the data value and the associated scale label of selected parameter 250b stored in the RAM. The third line displays the name of selected parameter 250b. The fourth line 264 will still display the motor direction in the lower left hand corner of LCD display 210, but the lower right hand corner will now read "main" since the new function of enter/menu 219 is to return the LCD display 210 to the main menu screen 246.

The parameter data value shown on the second line 262 of the parameter screen 248 can be of two types, "changeable" or "meter" data values. If LCD display is displaying the parameter screen 248, block 265, and shaft encoder 216 is rotated, a user may modify the meter value of the displayed data value only if the data value is a "changeable" value, block 269. If the data value is not a "changeable" value, rotation of shaft encoder 16 will have no effect. If the data value is changed by the user, block 271, micro-controller 200 will transmit the user adjusted data value to microprocessor 48 of soft starter 14 upon the subsequent depression of enter/menu pushbutton 219 to toggle back to main menu screen 246. Thereafter, micro-controller 200 returns to the Main subroutine, block 273.

In addition, upon depression of enter/menu pushbutton 219 to select a parameter 250b from main menu screen 246, micro-controller 200 sends a request through transceiver 222 over the network to the microprocessor 48 of the predominant peer motor control, self-starter 14, for the present value of the selected parameter 250b, which microprocessor 48 transmits back thereto.

It is contemplated that start pushbutton 220 work in conjunction with the motor direction pushbutton 218. Depression of motor direction pushbutton 218 by a user causes the lower left hand corner of LCD display 210 to toggle through a series of predetermined directional settings, e.g. forward, reverse, forward-jog, reverse-jog for AC induction motor 16, block 266. Referring FIG. 20, when the direction setting is in forward or reverse mode, the depression of the start pushbutton 220 causes micro-controller 200 to enter the Start subroutine, block 268, and send a command signal to the predominant motor control, self-starter 14, to start or stop AC induction motor 16, block 270, as heretofore described, in the user selected. When the direction is in the forward-jog or the reverse-jog directional setting, block 272, micro-controller 200 transmits a command signal, block 276, over the network to the predominant motor control, self-starter 14, upon release of the start pushbutton 220, block 274, to jog AC induction motor 16 in the user selected direction. Thereafter, the Start subroutine is ended, block 275.

Figure 21:
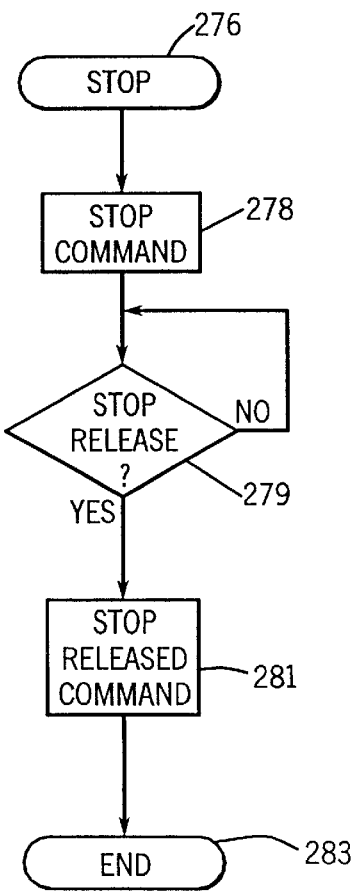
FIG. 21 is a flow chart of the Stop subroutine of the computer executable instructions of FIG. 16.

Referring to FIG. 21, upon depression of the stop pushbutton 221, the micro-controller 200 enters the Stop subroutine, block 276, and immediately sends a stop command, block 278, to the predominant motor control, soft starter 14, to stop AC induction motor 16. Upon release of stop pushbutton 220, block 279, micro-controller 200 sends a stop release command, block 281, to the predominant motor control, soft starter 14. The stop release command prevents soft starter 14 from being restarted until stop pushbutton 221 is released, regardless of whether or not a start command is received by microprocessor 48 at input 68b, or from another motor control on the network. Thereafter, the Stop subroutine ends, block 283.

Referring back to FIG. 17, after completing the above-described subroutines, micro-controller updates the LCD display 210, block 285, and returns to the step of scanning the input devices thereto.

Figure 23:
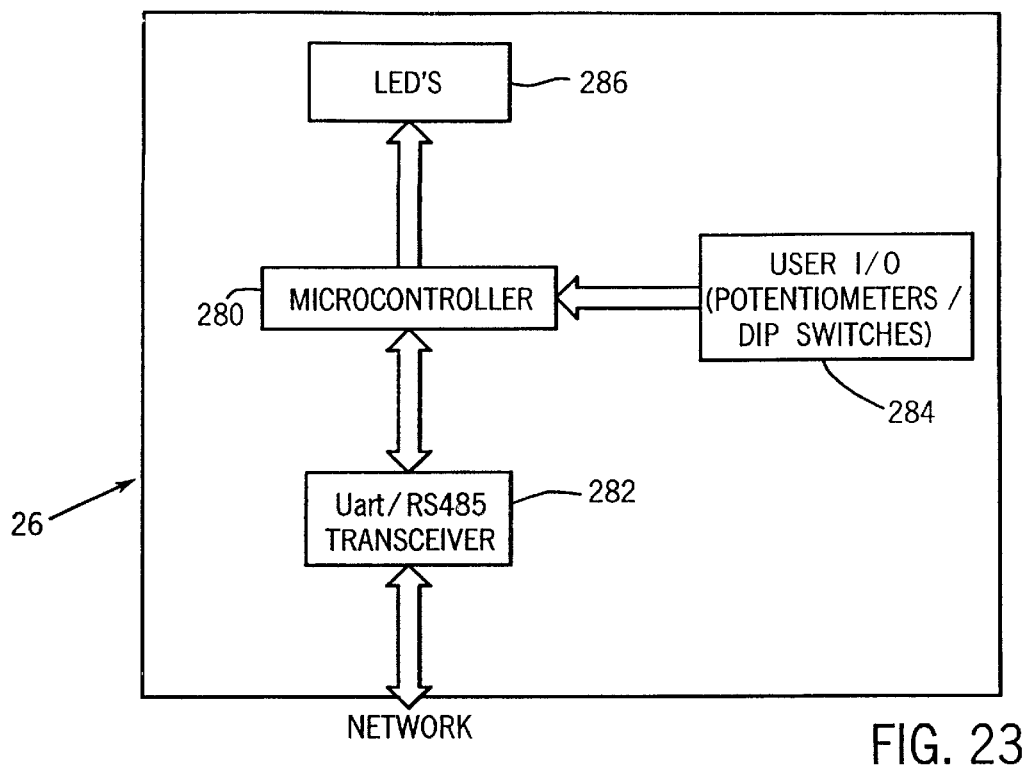
FIG. 23 is a schematic of the interface module of FIG. 22.
Figure 24:
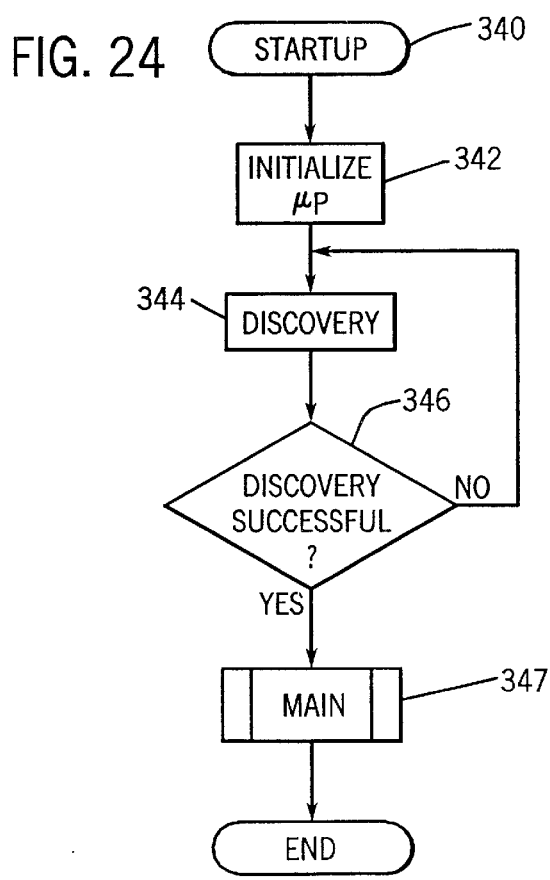
FIG. 24 is a flow chart of the computer executable instructions for the micro-controller of the interface module of FIG. 22.

Referring to FIGS. 22–24, motor control system 10 may include a programmable input/output module 26 having a micro-controller 280 interconnected to the network through transceiver 282. It is contemplated that transceiver 282 be a universal asynchronous receiver/transmitter such as a standard RS485 transceiver. Transceiver 282 allows micro-controller 280 to transmit and receive signals from the other motor controls over the network. Programmable input/output module 26 further includes a plurality of user input/output devices generally designated by the reference number 284 and a plurality of LED's generally designated by the reference number 286 which are also interconnected to a micro-controller 280.

As best seen in FIG. 22, the plurality of user input/output devices includes a first dip switch 290 movable between a first jam-on position and a second disabled position. In the jam-on position, micro-controller 280 transmits a control signal to microprocessor 48 of soft starter 14 over the network which instructs microprocessor 48 to monitor whether a jam condition is present on AC induction motor 16, as heretofore described. With dip switch 290 in the disabled position, micro-controller 280 transmits a control signal to microprocessor 48 of soft starter 14 instructing microprocessor 48 to disable the microprocessor's 48 monitoring of a potential jam condition on AC induction motor 16. If dip switch 290 is in the jam-on position and a jam condition is detected on AC induction motor 16 by microprocessor 48 of soft starter 14, microprocessor 48 of soft starter 14 will transmit an alarm signal to micro-controller 280 of programmable input/output module 26 over the network such that micro-controller 280 of programmable input/output module 26 enables and illuminates LED 292.

A second dip switch 294 is movable between a first stall-on position and a second disabled position. In the stall-on position, micro-controller 280 transmits a control signal to microprocessor 48 of soft starter 14 over the network which instructs microprocessor 48 to monitor whether a stall condition is present on AC induction motor 16 as heretofore described. With dip switch 294 in the disabled position, micro-controller 280 transmits a control signal to microprocessor 48 of soft starter 14 instructing microprocessor 48 to disable the microprocessor's 48 monitoring of a potential stall condition on AC induction motor 16. If dip switch 294 is in the stall-on position and a stall condition is detected on AC induction motor 16 by microprocessor 48 of soft starter 14, microprocessor 48 of soft starter 14 will transmit an alarm signal to micro-controller 280 of programmable input/output module 26 over the network such that micro-controller 280 of programmable input/output module 26 enables and illuminates LED 296.

A third dip switch 298 is movable between a first phase reversal position and a second disabled position. In the phase reversal position, micro-controller 280 transmits a control signal to microprocessor 48 of soft starter 14 over the network which instructs microprocessor 48 to monitor whether the phases on AC induction motor 16 are reversed, as heretofore described. With dip switch 298 in the disabled position, micro-controller 280 transmits a control signal to microprocessor 248 of soft starter 14 instructing microprocessor 48 to disable the microprocessor's 48 monitoring of a potential phase reversal on AC induction motor 16. If dip switch 298 is in the phase reversal position and a phase reversal condition is detected on the AC induction motor 16 by microprocessor 48 of soft starter 14, microprocessor 48 of soft starter 14 will transmit an alarm signal to micro-controller 280 of programmable input/output module 26 over the network such that micro-controller 280 of programmable input/output module 26 enables and illuminates LED 300.

Dip switch 302 is movable between a first manual reset position and a second auto reset position. In the manual reset position, micro-controller 280 transmits an instruction signal to microprocessor 48 of soft starter 14 instructing microprocessor 48 not to attempt to restart AC induction motor 16 after AC induction motor 16 has been stopped due to an overload or a fault, as heretofore described. With dip switch 302 in the auto reset position, micro-controller 280 transmits an instructions signal to microprocessor 48 of soft starter 14 such that soft starter 14 automatically attempts to restart AC induction motor 16 after a predetermined period of time after an overload or fault on AC induction motor 16 is determined.

Dip switch 304 is movable between a first normal start position and a second pump start position. With dip switch 304 in a normal start position, micro-controller 280 transmits an instruction signal to microprocessor 48 of soft starter 14 to perform a normal ramp start, block 120, of AC induction motor 16, as heretofore described, upon receipt of a start command. With dip switch 304 in the pump start position, micro-controller 280 transmits an instruction signal to microprocessor 48 of soft starter 14 to perform a pump start, block 122, of AC induction motor 16 upon receipt of a start command.

Dip switch 306 is movable between a first ramp start position and a second current limit position. With dip switch 306 in the ramp start position, micro-controller 280 transmits an instruction signal over the network to microprocessor 48 of soft starter 14 enabling microprocessor 48 to perform a normal ramp start, block 120, or a pump start, block 122, of AC induction motor 16 in response to receipt of a start command. With dip switch 306 in the current limit position, micro-controller 280 transmits an instruction signal to microprocessor 48 of soft starter 14 instructing soft starter 14 to perform a constant current start, block 124, of AC induction motor 16, as heretofore described, in response to a start command.

Programmable input/output module 26 further includes a plurality of potentiometers for varying various time periods and torque values during start up of motor 16. Potentiometer 320 allows the user to set the time period t1 for a kick start of AC induction motor 16 by soft starter 14. By rotating potentiometer 320, the voltage drop across potentiometer 320 is varied such that the magnitude of the voltage drop corresponds to a predetermined time period t1 for the kick start of AC induction motor 16. By way of example, potentiometer 320 is rotatable between t1 valve zero (0) seconds whereby no kick start of AC induction motor 16 is performed by soft starter 14 and two (2) seconds. In response to the setting of potentiometer 320 and the voltage drop thereacross, micro-controller 280 transmits an instruction signal to microprocessor 48 of soft starter 14 to perform a kick start for the selected time period t1, as heretofore described.

Potentiometer 322 allows the user to set the maximum torque value T1 for the kick start of AC induction motor 16 by soft starter 14. By rotating potentiometer 322, the voltage drop across potentiometer 322 is varied, such that the magnitude of the voltage drops corresponds to the user selected maximum torque T1 for the kick start of AC induction motor 16. By way of example, potentiometer 322 is rotatable between a first value corresponding to zero (0) torque whereby no kick start of AC induction motor 16 is performed by soft starter 14 and ninety percent (90%) of the full, direct online starting torque of the AC induction motor. In response to the setting of potentiometer 322 and the voltage drop thereacross micro-controller 280, transmits an instruction signal to microprocessor 48 over the network to perform a kick start ramping the torque generated by AC induction motor 16 to the user selected value T1.

Potentiometer 324 allows the user to set the time period t2 for soft starter 14 to ramp AC induction motor 16 to full operating speed. By rotating potentiometer 324, the voltage drop across potentiometer 324 is varied such that the magnitude of the voltage drop corresponds to the user selected time period t2 for the ramping of AC induction motor 16 from an initial user selected torque value T2 to a torque value corresponding to the operating of AC induction motor 16 at full voltage. By way of example, potentiometer 324 is rotatable between a value corresponding to a ramp time of 0.5 seconds and a value corresponding to a ramp time of one hundred eighty (180) seconds. In response to the setting of potentiometer 324 and the voltage drop thereacross, micro-controller 280 transmits an instruction signal to microprocessor 48 advising microprocessor 48 of the user selected time period t2 for bringing AC induction motor 16 to its full operating speed.

Potentiometer 326 allows the user to set the initial torque value T2 after the kick start of AC induction motor 16. By rotating potentiometer 326, the voltage drop across potentiometer 326 is varied such that the magnitude of the voltage drop corresponds to a predetermined initial torque T2 generated by AC induction motor 16 after the kick start thereof By way of example, potentiometer 326 is rotatable between a value corresponding to zero (0) torque whereby the motor 16 generates no torque after kick start, and a value corresponding to an initial torque of one hundred percent (100%) of the torque value provided by operating AC induction motor 16 at full supply voltage. In response to a setting of potentiometer 226 and a voltage drop thereacross, micro-controller 280 transmits an instruction signal to microprocessor 48 such that the initial torque will equal the user selected initial torque T2.

Potentiometer 328 allows the user to set the time period t3 for gradually increasing the duration of notch γ during the stopping of AC induction motor 16, as heretofore described. By rotating potentiometer 328, the voltage drop across potentiometer 328 is varied such that the magnitude of the voltage drop thereacross corresponds to a user selected time period t3 for gradually stopping AC induction motor 16. By way of example, potentiometer 328 is rotatable between a value corresponding to zero (0) seconds whereby the AC induction motor 16 is not gradually stopped and a value corresponding to sixty (60) seconds. The user selected setting of potentiometer 328 and the voltage drop thereacross, micro-controller 280 transmits an instruction signal to microprocessor 48 to gradually stop AC induction motor 16 after the opening bypass contactor 50, 52 and 54 and prior to opening thyristor switches 50, 52 and 54 for a time period t3 in a manner heretofore described.

Potentiometer 330 allows a user to advise microprocessor 48 of the full load ampere rating for AC induction motor 16.

By rotating potentiometer 330, the voltage drop thereacross is varied such that the magnitude of the voltage drop corresponds to a predetermined full load ampere rating for AC induction motor 16. In response to setting of potentiometer 320 and the voltage drop thereacross, micro-controller 280 transmits an instruction signal to microprocessor 48 advising microprocessor 48 of the full load ampere rating of AC induction motor 16.

Programmable input/output module 26 further includes first and second trip class dip switches 332 and 334, respectively. Each trip class dip switch 332 and 334 is movable between first and second positions. The combination of positions of trip class dip switches 332 and 334 allows a user to set the trip class for microprocessor 48 to monitor for a thermal overload on AC induction motor 16. In response to the combination of settings of trip class switches 332 and 334, micro-controller 280 transmits an instruction signal to microprocessor 48 instructing microprocessor 48 as to the desired trip class when determining if the thermal overload has occurred on AC induction motor 16. Programmable input/output module 26 further includes an LED 336 for signaling to a user that a thermal overload condition exists on AC induction motor 16. In response to a thermal overload condition on AC induction motor 16, microprocessor 48 transmits an instruction signal to micro-controller 280 advising micro-controller 280 of the thermal overload condition. In response thereto, micro-controller 280 enables overload LED 336 so as to advise a user accordingly.

Programmable input/output module 26 further includes a thermal overload LED 337. As previous described, microprocessor 48 further monitors for a thermal overload condition, block 106, on AC induction motor 16. If microprocessor 48 detects a thermal overload condition on AC induction motor 16, microprocessor 48 of soft starter 14 will transmit an alarm signal to micro-controller 280 of programmable input/output module 26 over the network such that micro-controller 280 of programmable input/output module 26 enables and illuminates thermal overload LED 337.

Referring to FIG. 24, a flow chart of the user executable instructions stored on micro-controller 280 is provided. At start up, block 340, micro-controller 280 is initialized, block 342. Thereafter, micro-controller 280 begins the discovery process, block 344, in order to transmits its identity to the other motor controls interconnected to the network and to discover the other motor controls interconnected to the network. Micro-controller 280 transmits a discovery signal onto the network through transceiver 282 and awaits a reply from the other motor controls, block 346. If discovery is not successful, the process is repeated. However, if discovery is successful, micro-controller 280 performs the Main subroutine, block 347, of its computer executable instructions.

Referring to FIG. 25, a flow chart for the Main subroutine of the computer executable instructions stored on micro-controller 280 is provided. In the Main subroutine, block 347, the micro-controller 280 scans the dip switches, block 348, and updates the jam LED 292, the stall LED 296, the phase reversal LED 300, the overload LED 336, and the thermal overload LED 337, block 350, in response to an instruction or alarm signal received from microprocessor 48 of soft starter 14. If micro-controller 280 receives a request for data over the network from microprocessor 48 of soft starter 14, block 352, micro-controller 280 processes the request from microprocessor 48, block 354, scans the potentiometers, block 356, and transmits the requested information regarding the position of the potentiometers and dip switches, block 358, to micro-controller 48 of soft starter 14, as heretofore described.

Figure 26:
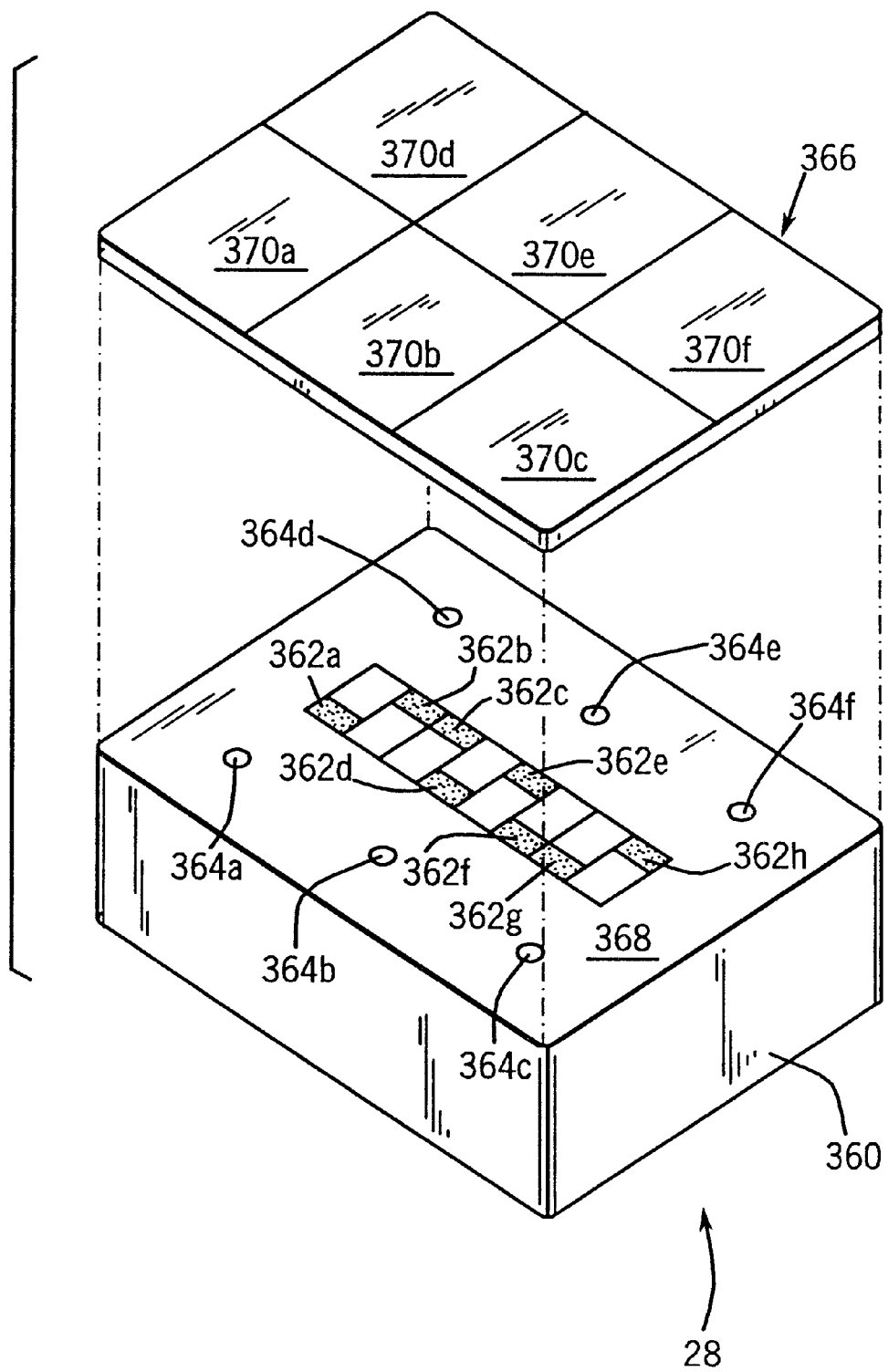
FIG. 26 is an exploded, isometric view of a button module for the motor control system of the present invention.

Referring to FIG. 26, button module 28 includes a housing 360 for supporting a plurality of dip switches 362a–362h and a plurality of pushbutton switches 364a–364f An overlay 366 is provided to overlay upper surface 368 of housing 360. Overlay 366 includes six button portions 370a–370f which overlap and correspond to pushbutton switches 364a–364f, respectively.

Referring to FIG. 28,. pushbuttons 364a–364f and dip switches 362a–362h are generally designated by the reference numeral 372. Input devices 372 are interconnected to a micro-controller 374 which, in turn, is interconnected the network by transceiver 376. It is contemplated that transceiver 376 be a universal asynchronous receiver/transmitter such as a standard RS485 transceiver. As best seen in FIGS. 27a–27c and 28, a plurality of LEDs 378a–378f may be interconnected to micro-controller 374 to indicate the status of a various motor parameters, as hereinafter described. LEDs 378a–378f correspond to and are position adjacent pushbuttons 364a–364f, respectively.

It is contemplated that each combination of settings of dip switches 362a–362h corresponds to a unique combination of assignments for pushbuttons 364a–364f and LEDs 378a–378f As such, by varying the settings of dip switches 362a–362h, micro-controller 374 will transmit different pre-programed instruction signals to the other motor controls of the motor control system 10 in response to the depression of pushbuttons 364a–364f and will enable different LEDs 378a–378f in response to receipt of a command from one of the other motor controls of the motor control system 10. By way of example, overlays 366a–366c are provided. Each overlay corresponds to a different settings of the dip switches 362a–362h and hence, different assignments for pushbuttons 364a–364f and LEDs 378a–378f Referring to FIG. 27a, pushbuttons 364a, 364c and 364d are unassigned, and hence, button portions 370a, 370c and 370d of overlay 366 are free of indicia. Based on the combination of settings of dip switches 362a–362h, pushbutton 364b is also unassigned, but micro-controller 374 enables LED 378b if motor control system 10 is off. As such, button portion 370b of overlay 366 has indicia indicating such an assignment.

In response to depression of pushbutton 364e, micro-controller 374 transmits a start command to microprocessor 48 of soft starter 14. LED 378e is enabled by micro-controller 374 in response to depression of pushbutton 364e in order to alert a user to that the start command has been transmitted by micro-controller 374. Button portion 370e of overlay 366 is provided which indicia thereon identifying the function of pushbutton 364e.

Similarly, based on the combination of settings of dip switches 362a–362h, depression of pushbutton 364f causes the micro-controller 374 to transmit a stop command to microprocessor 48 of soft starter 14 in order to stop AC induction motor 16, as heretofore described. Upon depression of pushbutton 364f, micro-controller 374 enables LED 378f in order to alert the user that the stop command has been transmitted by micro-controller 374. Button portion 370f of overlay 366 has indicia thereon to identify the function of pushbutton 364f.

Figure 27A:
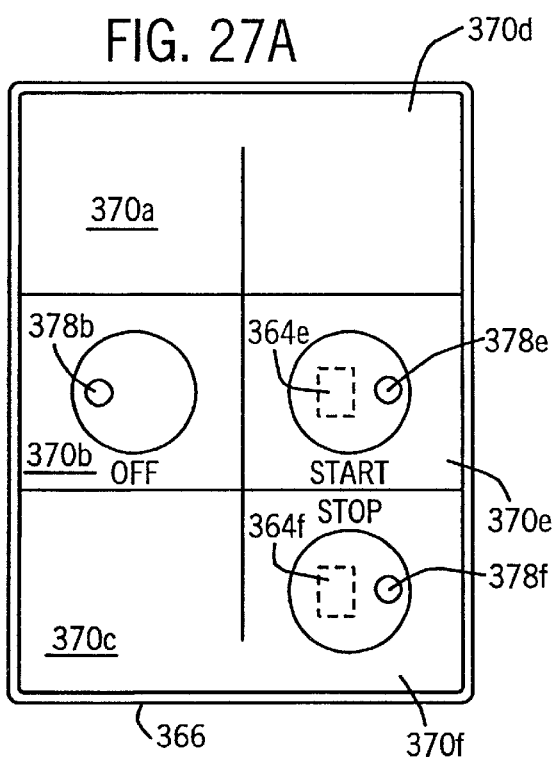
FIGS. 27a–27c are front elevational views of overlays for the button module of FIG. 26.
Figure 27B:
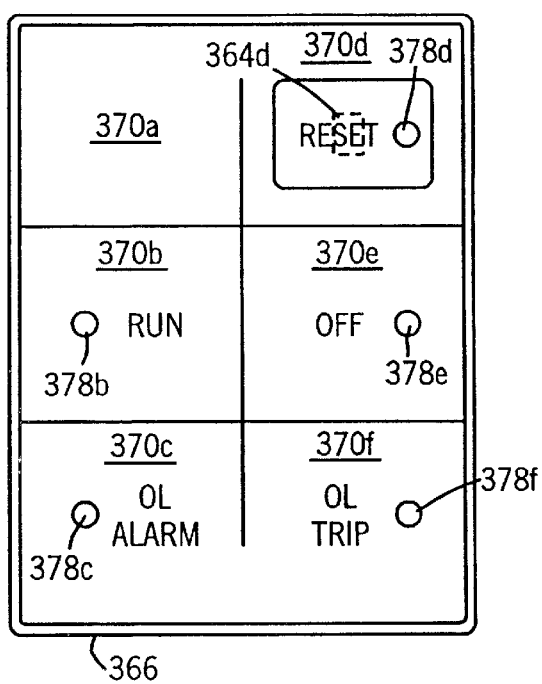
Figure 27C:
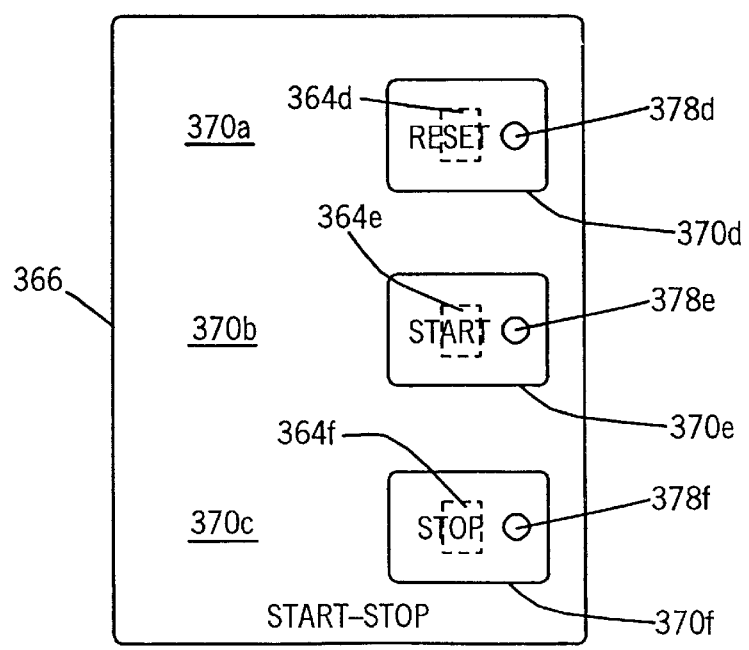

FIGS. 27b and 27c correspond to various alternate assignments for pushbuttons 364a–364f and for LEDs 378a–378f based on the combination of settings of dip switches 362a–362h. The indicia on button portions 370a–370f correspond to the assignments of pushbuttons 364a–364f and LEDs 378a–378f. FIGS. 27a–27c are provided as sample representation of the assignments for pushbuttons 364a–364f and LEDs 378a–378f, and are not intended to be limiting as to the possible assignments of pushbuttons 368a–368f and LEDs 378a–378f based upon the combination of settings of dip switches 362a–362h.

Figure 29:
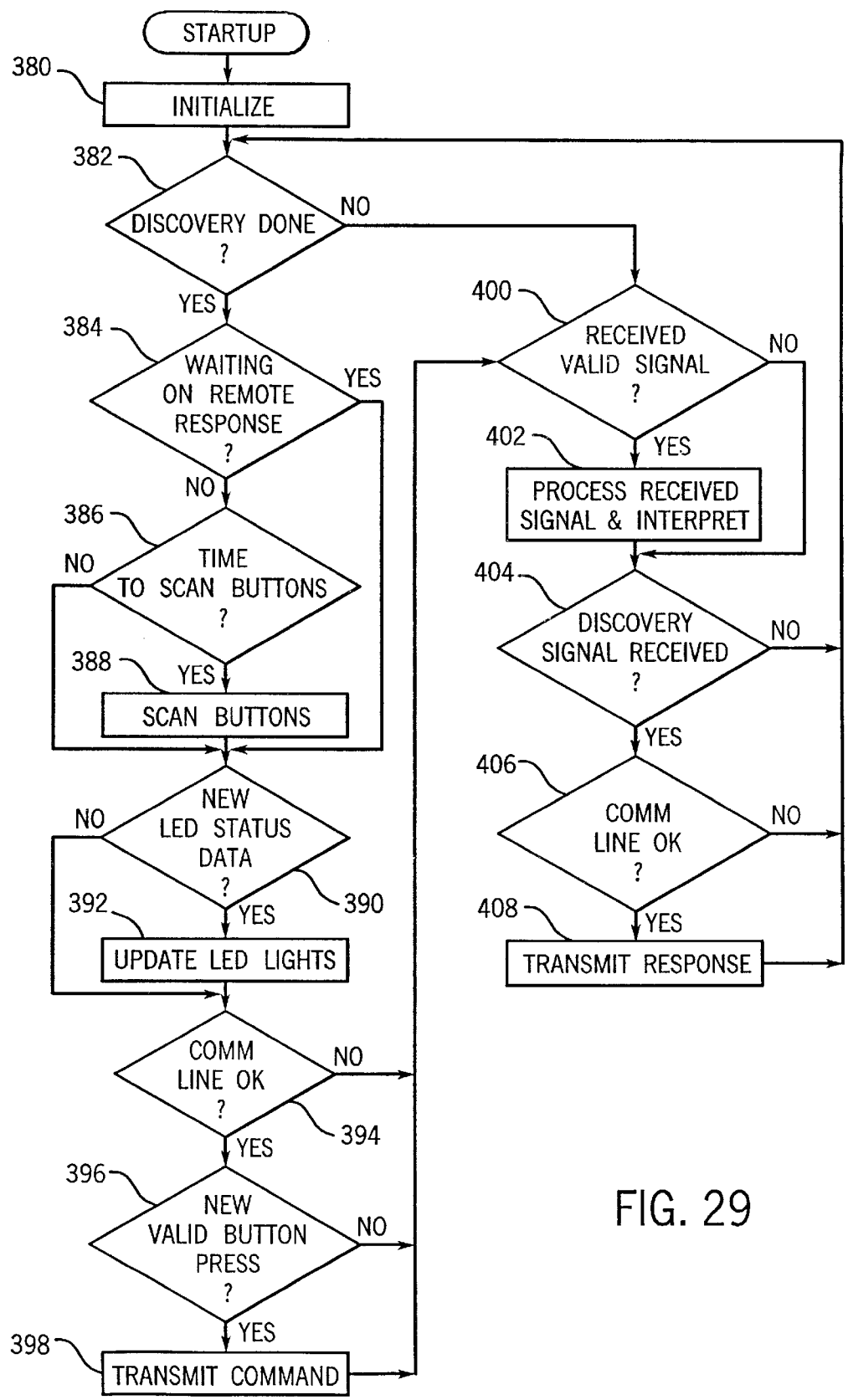
FIG. 29 is a flow chart of the computer executable instructions for the micro-controller of the button module of FIG. 28.

Referring to FIG. 29, a flow chart of the computer executable instructions executed by micro-controller 374 of button module 28 is provided. At start up, micro-controller 374 is initialized, block 380. During initialization, the banks of RAM of the micro-controller 374 are cleared; the input and output ports of micro-controller 374 and their data direction registers are set; and the communication variables and clock registers are initialized.

After initialization, micro-controller 374 begins a discovery process, block 382, in order to transmit its identity to the other motor controls interconnected to the network and discover the other motor controls interconnected to the network. Micro-controller 374 transmits a discovery signal onto the network through transceiver 376 until such time that micro-controller 374 receives a response from each of the other motor controls interconnected to the network, block 384.

While waiting for a response from the other motor controls interconnected to the network, micro-controller 374 will, at predetermined time intervals, block 386, scan pushbuttons 364a–364f to determine if one of the pushbuttons 364a–364f has been depressed. It is contemplated that micro-controller 374 may detect a stuck pushbutton 364a–364f if micro-controller 374 senses that a pushbutton 364a–364f is depressed for more than a predetermined number of consecutive scans.

If micro-controller 374 receives an instruction signal from one of the other motor controls interconnected to the network, block 390, micro-controller 374 determines if such instruction signal requires enabling an LED 378a–378f In response to receipt of such an instruction signal received from a peer motor control interconnected to the network, micro-controller 374 updates or enables the corresponding LED 378a–378f, block 392, as heretofore described.

If micro-controller 374 is properly connected to the network through transceiver 376, block 394, and if one of the pushbuttons 364a–364f has been validly depressed, block 396, micro-controller 374 transmits an instruction signal to the appropriate motor control on the network, block 398, based upon the settings of dip switches 362a–362h so as to perform the user desired command. Similarly, if micro-controller 374 receives a valid signal from one of the other motor controls, block 400, interconnected to the network, the micro-controller 374 processes the received signal and interprets the same, block 402, to perform the command.

Micro-controller 374 also may receive a discovery signal from one of the other motor controls interconnected to the network, block 404. If the micro-controller 374 is properly connected to the network by transceiver 376, block 406, micro-controller 374 transmits a response identifying itself to the corresponding motor control which transmitted the discovery signal, block 408.

Various modes of carrying out the invention are contemplated as being within the scope of the following claims particularly pointing out and distinctly claiming the subject matter which is regarded as the invention.

We claim:

1. A data interface module for allowing a user to modify the values of predetermined operating parameters for a motor driven by a motor control and for displaying the values and operating parameters, the motor control being operatively connected to a communications network for transmitting and receiving data thereon, comprising:

a visual display structure operatively connected to the communications network, the visual display structure selectively displaying one of a plurality of user selected screens, the user selected screens including a first screen for displaying a user scrollable list of operating parameters for the motor and a second screen for displaying a data value for a user selected operating parameter;

a micro-controller interconnected to the visual display structure; and a screen selection device operatively connected to the visual display structure for allowing a user to toggle between the first and second screens;

wherein the micro-controller downloads the user scrollable list of operating parameters from the motor control.

2. The data interface module of claim 1 further comprising:

a micro-controller interconnected to the visual display structure; and a communications link interconnecting the micro-controller to the communications network, the communications link receiving a predetermined packet of data from the motor control corresponding to the data value of the user selected operating parameter and providing the same to the micro-controller whereby the micro-controller causes the visual display structure to display the data value of the user selected operating parameter on the second screen.

3. The data interface module of claim 2 further comprising a data value adjustment device operatively connected to the micro-controller for adjusting the data value of the user selected operating parameter displayed to a user selected data value.

4. The data interface module of claim 3 wherein the data value adjustment device includes a shaft encoder wherein rotation of the shaft encoder varies the data value of the user selected operating parameter of the motor.

5. The data interface module of claim 1 further comprising a memory storage device operatively connected to the micro-controller for storing the user scrollable list of operating parameters.

6. The data interface module of claim 5 wherein the memory storage device includes a serial EEPROM, the serial EEPROM interfaced to the micro-controller by a serial peripheral interface.

7. The data interface module of claim 1 wherein the visual display structure includes a liquid crystal display.

8. The data interface module of claim 1 wherein the screen selection device includes pushbutton movable between a first non-depressed position and second depressed position wherein pressing of the pushbutton into the depressed position toggles the visual display structure between the first and second screens.

9. The data interface module of claim 1 wherein at least one of the screens of the visual display structure displays an operating direction for the motor.

10. The data interface module of claim 9 further comprising a motor direction scrolling device operatively connected to the visual display structure for changing the display of the operating direction of the motor.

11. The data interface module of claim 10 further comprising a motor direction selection device operatively connected to the micro-controller for changing the operating direction of the motor to the operating direction displayed.

12. The data interface module of claim 1 further comprising a stop selection device movable between a first non-depressed and a second depressed position wherein pressing the stop selection device to the depressed position stops the motor.

13. A data interface module for allowing a user to modify the value of a predetermined operating parameters for a motor driven by a motor control and for displaying the value of the operating parameters, the motor control being operatively connected to a communications network, comprising:
  a micro-controller for generating adjustment signals to adjust the value of a user selected operating parameter of the motor and for downloading a predetermined list of operating parameters for the motor from the motor control;
  a communications link for interconnecting the micro-controller and the communications network to transmit the adjustment signals to the motor control;
  a visual display structure operatively connected to the micro-controller, the visual display structure selectively displaying one of a plurality of user selected screens, the user selected screens including a user scrollable first screen for displaying at least a portion of the predetermined list of operating parameters for the motor and a second screen for displaying the value of the user selected operating parameter;
  a screen selection device operatively connected to the visual display structure for allowing a user to toggle between the first and second screens; and
  a parameter value adjustment device operatively connected to the micro-controller and having a plurality of discrete settings, the micro-controller
  generating the adjustment signal in response to setting of the parameter value adjustment device.

14. The data interface module of claim 13 wherein the micro-controller includes an universal asynchronous receiver/transmitter.

15. The data interface module of claim 14 wherein the communications link includes a transceiver operatively connected to the universal asynchronous receiver/transmitter of the micro-controller and to the network.

16. The data interface module of claim 14 further comprising a depressible motor direction scrolling device operatively connected to micro-controller, wherein the micro-controller causes the visual display structure to sequentially display each operating direction of the motor in response to depression of the motor direction scrolling device.

17. The data interface module of claim 16 further comprising a motor direction selection device operatively connected to the micro-controller for changing the operating direction of the motor to the operating direction displayed.

18. The data interface module of claim 13 wherein the micro-controller adjusts the display of the value of the user selected operating parameter in response to the setting of the parameter value adjustment device.

19. The data interface module of claim 13 wherein the parameter value adjustment device includes a shaft encoder wherein rotation of the shaft encoder varies the setting of the parameter value adjustment device.

20. The data interface module of claim 13 wherein at least one of the screens of the visual display structure displays an operating direction for the motor.

21. The data interface module of claim 13 further comprising a stop selection device movable between a first non-depressed and a second depressed position wherein pressing the stop selection device to the depressed position stops the motor.

22. The data interface module of claim 13 wherein the micro-controller includes a plurality of micro-controller executable instructions stored thereon for performing the steps of:
  determining the motor control interconnected to the communications network;
  downloading the list of the predetermined operating parameters to be displayed on the first screen of the visual display structure from the motor control; and
  displaying the portion of the list of predetermined operating parameters on the first screen of the visual display structure.

23. A method for allowing a user to modify the values of predetermined operating parameters for a motor driven by a motor control and for displaying the values of the operating parameters comprising the steps of:
  providing a data interface module having a visual display;
  interconnecting the data interface module to the communications network,
  determining the motor control interconnected to the communications network;
  downloading a list of the predetermined operating parameters from the motor control;
  displaying a user selected portion of the list of the predetermined operating parameters on the visual display;
  selecting one of the predetermined operating parameters to be displayed and providing the same as the selected operating parameter; and
  displaying the selected operating parameter and the value thereof on the visual display.

24. The method of claim 23 comprising the additional step of adjusting the value of the selected operating parameter.

25. The method of claim 23 comprising the additional steps of:
  displaying one of a plurality of operating directions of the motor on the visual display;
  scrolling through the plurality of operating directions of the motor on the visual display;
  selecting one of the plurality of operating directions of the motor and providing the same as the selected motor direction; and
  operating the motor in the selected motor direction.

26. The method of claim 23 comprising the additional steps of:
  providing the data interface device with a stop button; and
  depressing the stop button such that the motor stops.

27. The method of claim 23 comprising the additional steps of:
  providing the data interface device with an EEPROM; and
  storing the list of predetermined operating parameters on the EEPROM.

* * * * *